(12) United States Patent
Lee et al.

(10) Patent No.: US 10,098,172 B2
(45) Date of Patent: Oct. 9, 2018

(54) TECHNIQUES FOR MANAGING COMMUNICATION LINKS OF A PLURALITY OF RADIO ACCESS TECHNOLOGIES (RATS)

(71) Applicant: QUALCOMM Incorporated, San Diego, CA (US)

(72) Inventors: Hoon Ki Lee, San Jose, CA (US); Aziz Gholmieh, Del Mar, CA (US); Sivaramakrishna Veerepalli, San Diego, CA (US); Arnaud Meylan, San Diego, CA (US); Deepak Dhamdhere, San Jose, CA (US); Mahesh Kumar Kalikot Veetil, San Diego, CA (US); Umang Sureshbhai Patel, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/152,278

(22) Filed: May 11, 2016

(65) Prior Publication Data

US 2016/0338133 A1 Nov. 17, 2016

Related U.S. Application Data

(60) Provisional application No. 62/162,533, filed on May 15, 2015.

(51) Int. Cl.
*H04W 76/02* (2009.01)
*H04W 76/15* (2018.01)
(Continued)

(52) U.S. Cl.
CPC ............ *H04W 76/15* (2018.02); *H04L 43/00* (2013.01); *H04W 72/12* (2013.01);
(Continued)

(58) Field of Classification Search
CPC . H04W 76/02; H04W 76/025; H04W 76/026; H04W 84/12; H04W 88/06
See application file for complete search history.

(56) References Cited

U.S. PATENT DOCUMENTS

2010/0255849 A1    10/2010   Ore
2010/0255899 A1*   10/2010   Paulsen ................... G07F 17/32
                                                          463/25

(Continued)

FOREIGN PATENT DOCUMENTS

WO    WO-2014/148969 A1    9/2014
WO      WO2014148969      *  9/2014

OTHER PUBLICATIONS

International Search Report and Written Opinion—PCT/US2016/032110—ISA/EPO—Oct. 20, 2016 (19 total pages).

(Continued)

*Primary Examiner* — Mewale Ambaye
(74) *Attorney, Agent, or Firm* — Dalei Dong; Arent Fox LLP

(57) ABSTRACT

A UE may receive, via a first communication link that uses a first radio access technology (RAT), information that identifies a threshold associated with a second communication link that uses a second RAT. The UE may monitor one or more communications on the second communication link. The UE may determine whether a parameter associated with the second communication link satisfies the threshold based at least in part on monitoring the one or more communications on the second communication link. The UE may provide a message via the first communication link when the parameter associated with the second communication link satisfies the threshold.

14 Claims, 23 Drawing Sheets

(51) Int. Cl.
*H04W 72/12* (2009.01)
*H04L 12/26* (2006.01)
*H04W 76/16* (2018.01)
*H04W 88/06* (2009.01)

(52) U.S. Cl.
CPC ....... *H04W 76/025* (2013.01); *H04W 76/026* (2013.01); *H04W 76/16* (2018.02); *H04W 88/06* (2013.01)

(56) References Cited

U.S. PATENT DOCUMENTS

| | | | |
|---|---|---|---|
| 2012/0196644 A1* | 8/2012 | Scherzer | ............... H04W 48/18 455/524 |
| 2013/0102313 A1 | 4/2013 | Tinnakornsrisuphap et al. | |
| 2013/0242783 A1 | 9/2013 | Horn et al. | |
| 2014/0213256 A1 | 7/2014 | Meylan et al. | |
| 2014/0328318 A1 | 11/2014 | Sundararajan et al. | |

OTHER PUBLICATIONS

Partial International Search Report—PCT/US2016/032110—ISA/EPO—Aug. 2, 2016(8 total pages).

* cited by examiner

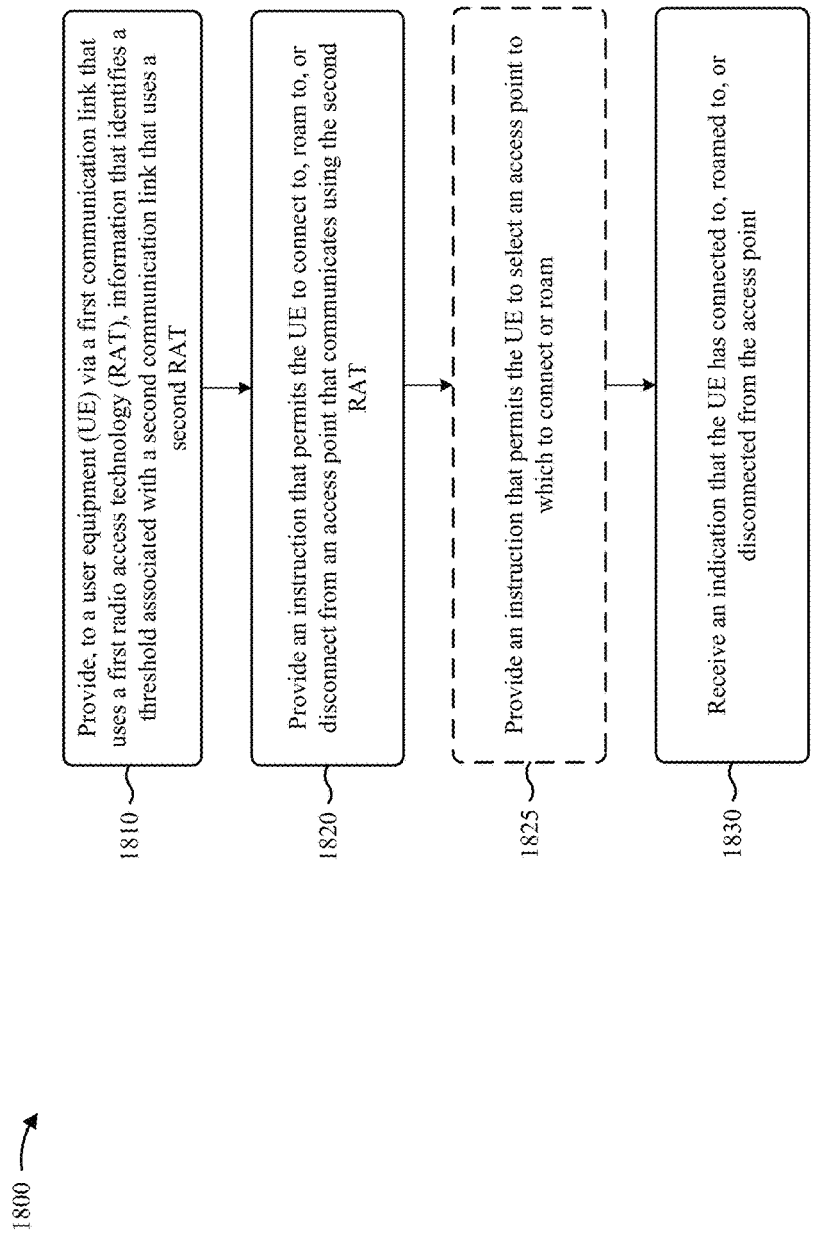

TECHNIQUES FOR MANAGING COMMUNICATION LINKS OF A PLURALITY OF RADIO ACCESS TECHNOLOGIES (RATS)

CLAIM OF PRIORITY UNDER 35 U.S.C. § 120

The present application claims priority to Provisional Application No. 62/162,533 entitled "TECHNIQUES FOR MANAGING COMMUNICATION LINKS OF A PLURALITY OF RADIO ACCESS TECHNOLOGIES (RATS)," and filed May 15, 2015, which is assigned to the assignee hereof and hereby expressly incorporated by reference herein.

FIELD OF THE DISCLOSURE

Aspects of the present disclosure relate generally to wireless communications, and more particularly, to techniques for managing communication links of a plurality of radio access technologies (RATs).

BACKGROUND

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

The wireless communications with a UE or a network device (e.g., base station, eNodeB) may take place over two separate radio access technologies (RATs), where the first RAT may correspond to a WWAN RAT (e.g., Long Term Evolution (LTE)) and the second RAT may correspond to a wireless local area network (WLAN) RAT (e.g., Wi-Fi). The connections to the RATs (e.g., links) are likely to have different properties in terms of supporting coverage areas or other properties. In such a scenario, a UE may leave a coverage area of a device, such as an access point, that communicates via the second RAT while remaining in a coverage area of another device, such as a base station, that communicates via the first RAT. In this case, packets may be dropped by the access point without being communicated to the UE. Furthermore, the UE may consume battery power by periodically transmitting a measurement report to the base station in order to maintain connectivity via the second RAT.

For example, in LTE-WLAN aggregation, cellular LTE coverage may be different from WLAN access point (AP) coverage. In this case, it may be difficult to reduce or eliminate packet loss while reducing power consumption during switching from one WLAN AP to another WLAN AP, or when switching from a WLAN to a WWAN, such as an LTE network. These issues may be partially addressed by using a network-directed approach to LTE-WLAN aggregation. However, such an approach may cause packet loss and excess UE power consumption. Techniques described herein overcome these and other shortcomings by improving the management of LTE-WLAN (or WWAN-WLAN) aggregation.

SUMMARY

In some aspects, a method for wireless communication may include establishing a first communication link between an user equipment and a network using a first RAT. The method may further include receiving, by an user equipment (UE) receiving, by the UE and via the first communication link, information that identifies a threshold associated with a second communication link between the UE and the network, wherein the UE may be concurrently coupled with the network via the first communication link using the first RAT and the second communication link using the second RAT. The method may include monitoring, by the UE, one or more communications on the second communication link. The method may include determining, by the UE and based at least in part on monitoring the one or more communications on the second communication link, whether a parameter associated with the second communication link satisfies the threshold. The method may include providing, by the UE, a message via the first communication link when the parameter associated with the second communication link satisfies the threshold.

In some aspects, the threshold is associated with a usable coverage area of an access point that communicates using the second RAT. In such instance, the method may further comprise receiving, via the first communication link, an instruction that permits the UE to connect to the access point and connecting to the access point based at least in part on receiving the instruction and based at least in part on determining that the parameter satisfies the threshold. In some aspects, the UE may the UE communicates with a serving access point using the second RAT and the threshold is associated with the serving access point or a neighbor access point that communicates using the second RAT. In one or more examples, the method may include receiving, via the first communication link, an instruction that permits the UE to roam from the serving access point to the neighbor access point and roaming to the neighbor access point based at least in part on receiving the instruction and based at least in part on determining that the parameter satisfies the threshold.

In other aspects, the UE may communicate with a service access point using the second RAT. The threshold may be associated with a degraded coverage area of the serving access point. In some examples, the method may comprise disconnecting from the serving access point based at least in part on determining that the parameter satisfies the threshold. In some aspects, the method may further comprise receiving information that identifies one or more access points that communicate using the second RAT and determining whether the parameter satisfies the threshold further comprises determining whether the parameter, associated with the one or more access points, satisfies the threshold. The information that identifies the one or more access points includes at least one of a service set identifier (SSID) or a basic service set identifier (BSSID).

In some aspects, the method may include receiving information that identifies one or more conditions for connecting or roaming to an access point that communicates using the second RAT. The method may comprise determining whether the one or more conditions are satisfied and connecting or roaming to the access point based at least in part on determining that the one or more conditions are satisfied. The one or more conditions may be associated with at least one of a throughput associated with the access point, a received signal strength indicator (RSSI) associated with the access point, or a modulation and coding scheme (MCS) associated with the access point.

In some examples, the method may include receiving one or more access point identifiers corresponding to one or more access points that communicate using the second RAT. The method may comprise selecting an access point, of the one or more access points, to which to connect or roam, connecting or roaming to the access point based at least in part on selecting the access point, and providing, via the first communication link, information that identifies the access point. The method may further comprise receiving one or more access point identifiers corresponding to one or more access points that communicate using the second RAT to which the UE may not be permitted to connect. Accordingly, the method may include preventing the UE from connecting or roaming to the one or more access points.

In some examples, the method may include receiving information that identifies a number of messages to be provided and providing the number of message. The method may further include receiving, via the first communication link, an instruction that permits the UE to connect to an access point based at least in part on the number of messages and connecting to the access point based at least in part on receiving the instruction.

Additionally or alternatively, the method may include receiving an instruction that permits the UE to select an access point to which to connect or roam, selecting a neighbor access point to which to connect or roam based at least in part on receiving the instruction, and connecting or roaming to the neighbor access point based at least in part on selecting the neighbor access point. In some aspects, selecting the neighbor access point may be based at least in part on at least one of a RSSI associated with the neighbor access point, a throughput associated with the neighbor access point, a load associated with the neighbor access point, or a radio frequency spectrum band associated with the neighbor access point.

In some examples, the method may further comprise providing, via the first communication link, information that identifies a plurality of access points. The method may further include receiving, via the first communication link, information that identifies an access point of the plurality of access points, and connecting or roaming to the access point. In one or more examples, the method may further include connecting to an access point, that communicates using the second RAT, based at least in part on determining whether the parameter satisfies the threshold. The method may include providing, to the access point, information that identifies a base station that communicates with the UE via the first communication link.

In yet further examples, the method may include connecting to a neighbor access point, that communicates using the second RAT, based at least in part on determining whether the parameter satisfies the threshold. Connecting to the neighbor access point may be based at least in part on a determination that a serving access point, that communicates with the UE using the second RAT, has finished transmitting one or more scheduled communications to the UE.

In some examples, the UE communicates with a serving access point using the second RAT. In such situations, the method may comprise receiving user input that indicates that the UE is to be disconnected from the serving access point, and disconnecting from the serving access point based at least in part on receiving the user input. In yet further examples, the method may comprise receiving, via the first communication link, an instruction to disconnect from the serving access point, and disconnecting from the serving access point based at least in part on receiving the instruction.

In further examples, the method may include determining that a threshold amount of time has elapsed since the message was provided and disconnecting from the serving access point based at least in part on determining that the threshold amount of time has elapsed since the message was provided. The method may also include disconnecting from the serving access point and searching for a neighbor access point based at least in part on disconnecting from the serving access point. In one or more examples, the method may include preventing the UE from providing a periodic measurement report when the parameter does not satisfy the threshold.

In some examples, the UE may communicate with a serving access point using the second RAT. In one or more aspects, the threshold includes a first threshold associated with the serving access point, and a second threshold associated with a neighbor access point that communicates using the second RAT. In such conditions, the method may include determining that a first parameter, associated with the serving access point, satisfies the first threshold. The method may further include determining that a second parameter, associated with the neighbor access point, does not satisfy the second threshold. In some examples, the method may include preventing the UE from providing the message based at least in part on determining that the first parameter satisfies the first threshold and the second parameter does not satisfy the second threshold.

In some aspects, the method may include determining that a radio resource control (RRC) connection, associated with the UE, has been released, and maintaining a connection with the serving access point for a period of time after determining that the RRC connection has been released. The period of time may be based at least in part on at least one of information received via the first communication link or information associated with mobility of the UE. In further examples, the parameter may be associated with the serving access point, and the method may comprise determining that the parameter is less than the threshold. In some examples, the method may include disconnecting from the serving access point or roaming to a neighbor access point based at least in part on determining that the parameter is less than the threshold. In one or more examples, the method may further include determining that another RRC connection has been established with a base station and providing, to the base station, information that identifies the serving access point.

In some aspects, a method for wireless communication may include providing, by a base station and to an user equipment (UE) via a first communication link that uses a first radio access technology (RAT), information that identifies a threshold associated with a second communication link that uses a second RAT. The method may include providing, by the base station, an instruction that permits the UE to connect to, roam to, or disconnect from an access point that communicates using the second RAT. The method may include receiving, by the base station, an indication that the UE has connected to, roamed to, or disconnected from the access point.

In some examples, the threshold may be associated with a usable coverage area of the access point, and the method may comprise receiving information that identifies a plurality of access points, the plurality of access points including the access points. The method may further comprise selecting the access point based at least in part on receiving the information that identifies the plurality of access points. In some aspects, providing the instructions may comprise providing, via the first communication link, an instruction for the UE to connect to or roam to the access point based at least in part on selecting the access point.

In further examples, selecting the access point may be based at least in part on of an RSSI associated with the access point, a throughput associated with the access point, a load associated with the access point, a connectivity associated with the access point, or a radio frequency spectrum band associated with the access point. In further examples, the method may include providing an instruction that permits the UE to select an access point to which to connect or roam.

In some aspects, the threshold may be associated with a degraded coverage area of a serving access point associated with the UE. In such situations, the method may comprise receiving a message based at least in part on a determination that a parameter, associated with the serving access point, satisfies the threshold. The method further includes providing an instruction to disconnect from the serving access point based at least in part on receiving the message.

In one or more examples, the method may comprise receiving a message from the UE and preventing communications from being scheduled for delivery to the UE via a serving access point that communicates with the UE using the second RAT based at least in part on receiving the message. The method may further comprise receiving, from the serving access point, an indication that one or more scheduled communications have been transmitted to the UE. In some examples, the method may include providing the instruction based at least in part on receiving the indication that the one or more scheduled communications have been transmitted to the UE.

In yet further examples, the method may include receiving a confirmation that the UE has connected to the access point and scheduling communications for delivery to the UE via the access point based at least in part on receiving the confirmation. In some aspects, the method may comprise providing one or more access point identifiers corresponding to one or more access points, that communicate using the second RAT, to which the UE is not permitted to connect.

In some aspects, a device for wireless communication may include one or more processors to establish a first communication link between an user equipment and a network using a first RAT. The device may further receive, via the first communication link, information that identifies a threshold associated with a second communication link between the UE and the network. The UE may be concurrently coupled with the network via the first communication link using the first RAT and the second communication link using the second RAT. The one or more processors may monitor one or more communications on the second communication link. The one or more processors may determine, based at least in part on monitoring the one or more communications on the second communication link, whether a parameter associated with the second communication link satisfies the threshold. The one or more processors may provide a message via the first communication link when the parameter associated with the second communication link satisfies the threshold. In some aspects, the device may be an user equipment (UE). In some aspects, the device may be configured to perform one or more methods described above.

In some aspects, a device for wireless communication may include one or more processors to provide, to an user equipment (UE) via a first communication link that uses a first radio access technology (RAT), information that identifies a threshold associated with a second communication link that uses a second RAT. The one or more processors may provide an instruction that permits the UE to connect to, roam to, or disconnect from an access point that communicates using the second RAT. The one or more processors may receive an indication that the UE has connected to, roamed to, or disconnected from the access point. In some aspects, the device may be a base station. In some aspects, the base station may be configured to perform one or more methods described above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 14-18 are flow diagrams of an example process for WWAN-WLAN aggregation management, in accordance with various aspects of the present disclosure.

DETAILED DESCRIPTION

The following detailed description of example aspects refers to the accompanying drawings. The same reference numbers in different drawings may identify the same or similar elements.

Various techniques, including methods, apparatuses, devices, and systems, are described for aggregating of data from WWAN and WLAN. The techniques described herein may be used for one or more of various wireless communication networks, such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT), such as universal terrestrial radio access (UTRA), CDMA2000, or the like. UTRA may include wideband CDMA (WCDMA) and/or other variants of CDMA. CDMA2000 may include Interim Standard (IS)-2000, IS-95, and IS-856 standards. IS-2000 may also be referred to as 1×radio transmission technology (1×RTT), CDMA2000 1×, or the like. A TDMA network may implement a RAT, such as global system for mobile communications (GSM), enhanced data rates for GSM evolution (EDGE), or GSM/EDGE radio access network (GERAN). An OFDMA network may implement a RAT, such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
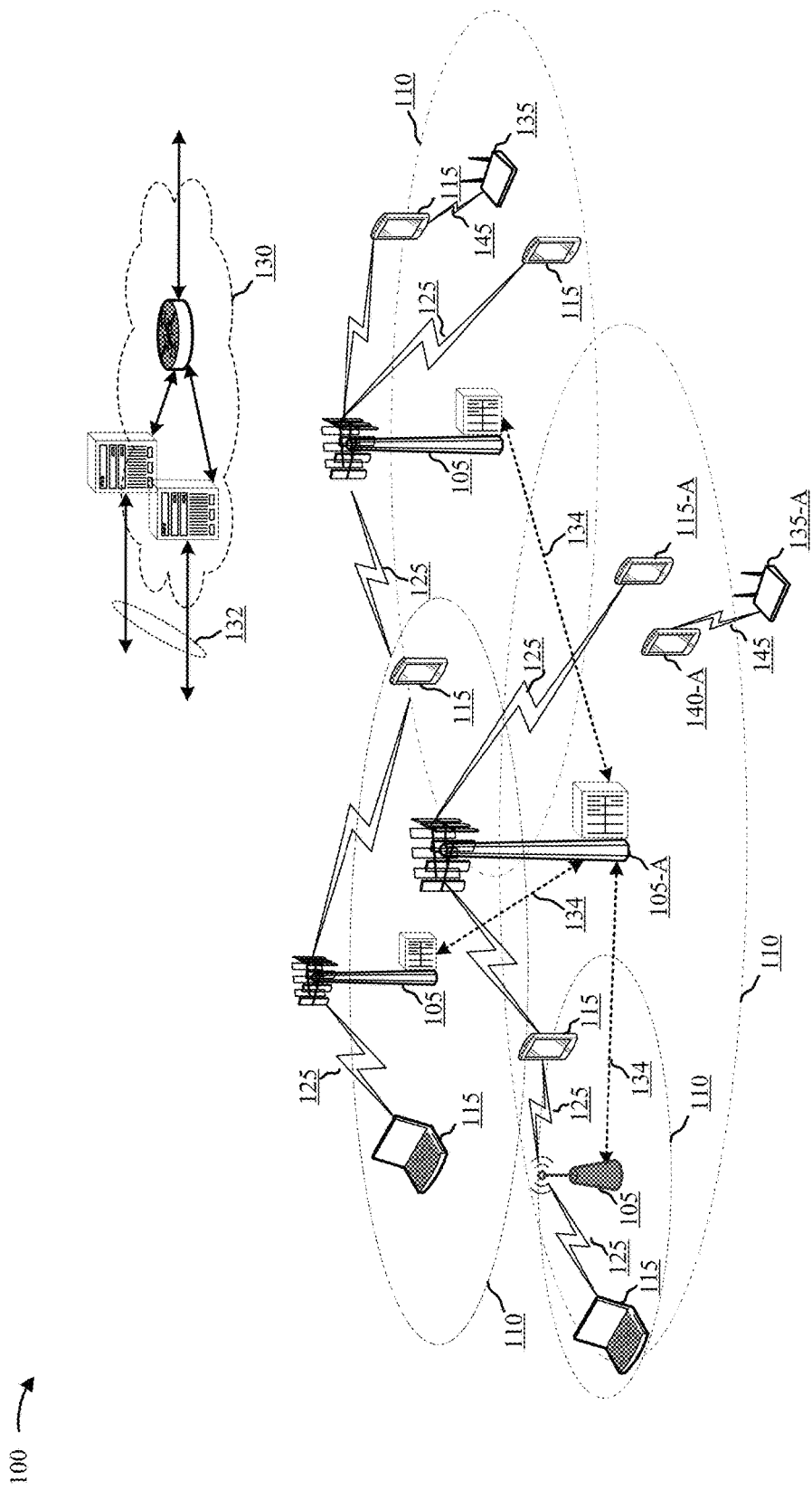
FIG. 1 is a conceptual diagram illustrating an example wireless communication system, in accordance with various aspects of the present disclosure.

FIG. 1 is an illustration of an example wireless communication system 100, in accordance with various aspects of the disclosure. The wireless communication system 100 may include a WWAN network, such as a cellular network, and a WLAN network, such as a Wi-Fi network. The cellular network may include one or more base stations 105, 105-A, one or more UEs 115, 115-A, and a core network 130. The Wi-Fi network may include one or more WLAN access points 135, 135-A (e.g., Wi-Fi access points) and one or more WLAN stations 140, 140-A (e.g., Wi-Fi stations).

With reference to the cellular network of the wireless communication system 100, the core network 130 may provide user authentication, access authorization, tracking, Internet Protocol (IP) connectivity, and other access, routing, or mobility functions. The base stations 105, 105-A may interface with the core network 130 through backhaul links 132 (e.g., S1, etc.) and may perform radio configuration and scheduling for communication with the UEs 115, 115-A, or may operate under the control of a base station controller (not shown). In various examples, the base stations 105, 105-A may communicate, either directly or indirectly (e.g., through core network 130), with each other over backhaul links 134 (e.g., X2, etc.), which may be wired or wireless communication links.

The base stations 105, 105-A may wirelessly communicate with the UEs 115, 115-A via one or more base station antennas. Each of the base station 105, 105-A sites may provide communication coverage for a respective geographic coverage area 110. In some examples, a base station 105, 105-A may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-A may be divided into sectors making up a portion of the coverage area (not shown). The cellular network may include base stations 105, 105-A of different types (e.g., macro and/or small cell base stations). There may be overlapping geographic coverage areas 110 for different technologies.

In some examples, the cellular network may include an LTE/LTE-A network. In LTE/LTE-A networks, the term evolved Node B (eNB) may be used to describe the base stations 105, 105-A, while the term UE may be used to describe the UEs 115, 115-A. The cellular network may be a Heterogeneous LTE/LTE-A network in which different types of eNBs provide coverage for various geographical regions. For example, each eNB or base station 105, 105-A may provide communication coverage for a macro cell, a small cell, and/or another type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, or the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115, 115-A and the base stations 105, 105-A or core network 130 supporting radio bearers for the user plane data. At the Physical (PHY) layer, the transport channels may be mapped to Physical channels.

The UEs 115, 115-A may be dispersed throughout the wireless communication system 100, and each UE 115, 115-A may be stationary or mobile. A UE 115, 115-A may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, an user agent, a mobile client, a client, or some other suitable terminology. A UE 115, 115-A may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-A and network equipment, including macro eNBs, small cell eNBs, relay base stations, or the like.

The communication links 125 shown in wireless communication system 100 may carry downlink (DL) transmissions from a base station 105, 105-A to a UE 115, 115-A, and/or uplink (UL) transmissions from a UE 115, 115-A to a base station 105, 105-A. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105, 105-A and/or UEs 115, 115-A may include multiple antennas for employing antenna diversity schemes to improve communication quality and reliability between base stations 105, 105-A and UEs 115, 115-A. Additionally or alternatively, base stations 105, 105-A and/or UEs 115, 115-A may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-A may be configured with multiple downlink CCs and one or more uplink CCs for carrier aggregation. Carrier aggregation may be used with both FDD and TDD component carriers.

With reference to the Wi-Fi network of the wireless communication system 100, the WLAN access points 135, 135-A may wirelessly communicate with the WLAN stations 140, 140-A via one or more WLAN access point antennas, over one or more communication links 145. In some examples, the WLAN access points 135, 135-A may communicate with the WLAN stations 140, 140-A using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac).

In some examples, a WLAN station 140, 140-A may be a cellular phone, a personal digital assistant (PDA), a wireless communication device, a handheld device, a tablet computer, a laptop computer, or the like. In some examples, an apparatus may include aspects of both a UE 115, 115-A and a WLAN station 140, 140-A, and such an apparatus may communicate with one or more base stations 105, 105-A using a first radio access technology (RAT) (e.g., a cellular RAT or multiple cellular RATs), and communicate with one or more WLAN access points 135, 135-A using a second RAT (e.g., a Wi-Fi RAT or multiple Wi-Fi RATs).

In some examples, the base stations 105, 105-A and UEs 115, 115-A may communicate over a licensed radio frequency spectrum band and/or an unlicensed radio frequency spectrum band, whereas the WLAN access points 135, 135-A and WLAN stations 140, 140-A may communicate over the unlicensed radio frequency spectrum band. The unlicensed radio frequency spectrum band may therefore be shared by the base stations 105, 105-A, the UEs 115, 115-A, the WLAN access points 135, 135-A, and/or the WLAN stations 140, 140-A.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2:
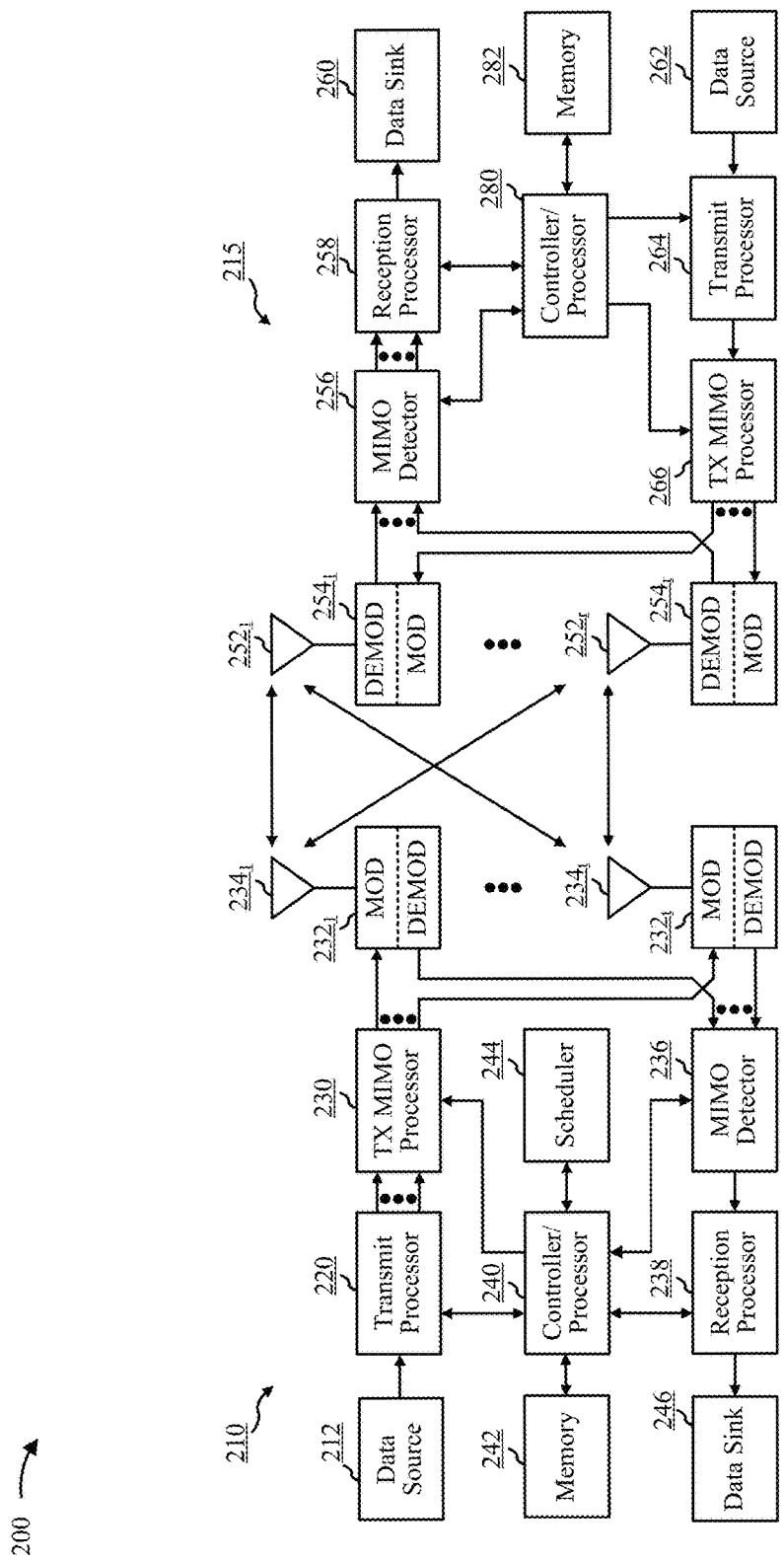
FIG. 2 is a block diagram illustrating an example components of a base station/eNodeB (eNB) and a UE, in accordance with various aspects of the present disclosure.

FIG. 2 is an illustration of example components of a base station/eNodeB 210 and a UE 215, in accordance with various aspects of the present disclosure. For example, base station/eNodeB 210 and UE 215, shown in FIG. 2, may correspond to base station/eNodeB 105 and UE 115, respectively, shown in FIG. 1. Base station 210 may be equipped with antennas $234_{1-t}$, and UE 215 may be equipped with antennas $252_{1-r}$, wherein t and r are integers greater than or equal to one.

At base station 210, a base station transmit processor 220 may receive data from a base station data source 212 and control information from a base station controller/processor 240. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 220 may process (e.g., encode and symbol map) the data and control information to obtain data symbols and control symbols, respectively. Base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to base station modulators/demodulators (MODs/DEMODs) $232_{1-t}$. Each base station modulator/demodulator 232 may process a respective output symbol stream (e.g., for orthogonal frequency-division multiplexing (OFDM), or the like) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via antennas $234_{1-t}$, respectively.

At UE 215, UE antennas $252_{1-r}$ may receive the downlink signals from base station 210 and may provide received signals to UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all UE modulators/demodulators $254_{1-r}$, and perform MIMO detection on the received symbols, if applicable, and provide detected symbols. A UE reception processor 258 may process (e.g., demodulate, deinterleave, and decode) the detected symbols, provide decoded data for UE 215 to a UE data sink 260, and provide decoded control information to a UE controller/processor 280.

On the uplink, at UE 215, a UE transmit processor 264 may receive and process data (e.g., for the Physical Uplink Shared Channel (PUSCH)) from a UE data source 262 and control information (e.g., for the Physical Uplink Control Channel (PUCCH)) from UE controller/processor 280. UE transmit processor 264 may also generate reference symbols for a reference signal. The symbols from UE transmit processor 264 may be precoded by a UE TX MIMO processor 266, if applicable, may be further processed by UE modulator/demodulators $254_{1-r}$ (e.g., for SC-FDM, etc.), and may be transmitted to base station 210. At base station 210, the uplink signals from UE 215 may be received by base station antennas 234, processed by base station modulators/demodulators 232, detected by a base station MIMO detector 236, if applicable, and further processed by a base station reception processor 238 to obtain decoded data and control information sent by UE 215. Base station reception processor 238 may provide the decoded data to a base station data sink 246 and the decoded control information to base station controller/processor 240.

Base station controller/processor 240 and UE controller/processor 280 may direct the operation at base station 210 and UE 215, respectively. Base station controller/processor 240 and/or other processors and modules at base station 210 may perform or direct, for example, execution of various processes for the techniques described herein. UE controller/processor 280 and/or other processors and modules at UE 215 may also perform or direct, for example, execution of one or more blocks illustrated in FIG. 6, and/or other processes for the techniques described herein. A base station memory 242 and a UE memory 282 may store data and program codes for base station 210 and UE 215, respectively. A scheduler 244 may schedule UEs 215 for data transmission on the downlink and/or uplink.

In one configuration, base station 210 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be base station controller/processor 240, base station memory 242, base station transmit processor 220, base station modulators/demodulators 232, and/or base station antennas 234 configured to perform the functions recited by the aforementioned means. In another aspect, the aforementioned means may be a module or any apparatus configured to perform the functions recited by the aforementioned means. In one configuration, UE 215 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be UE controller/processor 280, UE memory 282, UE reception processor 258, UE MIMO detector 256, UE modulators/demodulators 254, and/or UE antennas 252 configured to perform the functions recited by the aforementioned means. In another aspect, the aforementioned means may be a module or any apparatus configured to perform the functions recited by the aforementioned means.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single components, or a single components shown in FIG. 2 may be implemented as multiple, distributed components. Additionally, or alternatively, a set of components (e.g., one or more components) shown in FIG. 2 may perform one or more functions described as being performed by another set of components shown in FIG. 2.

Figure 3:
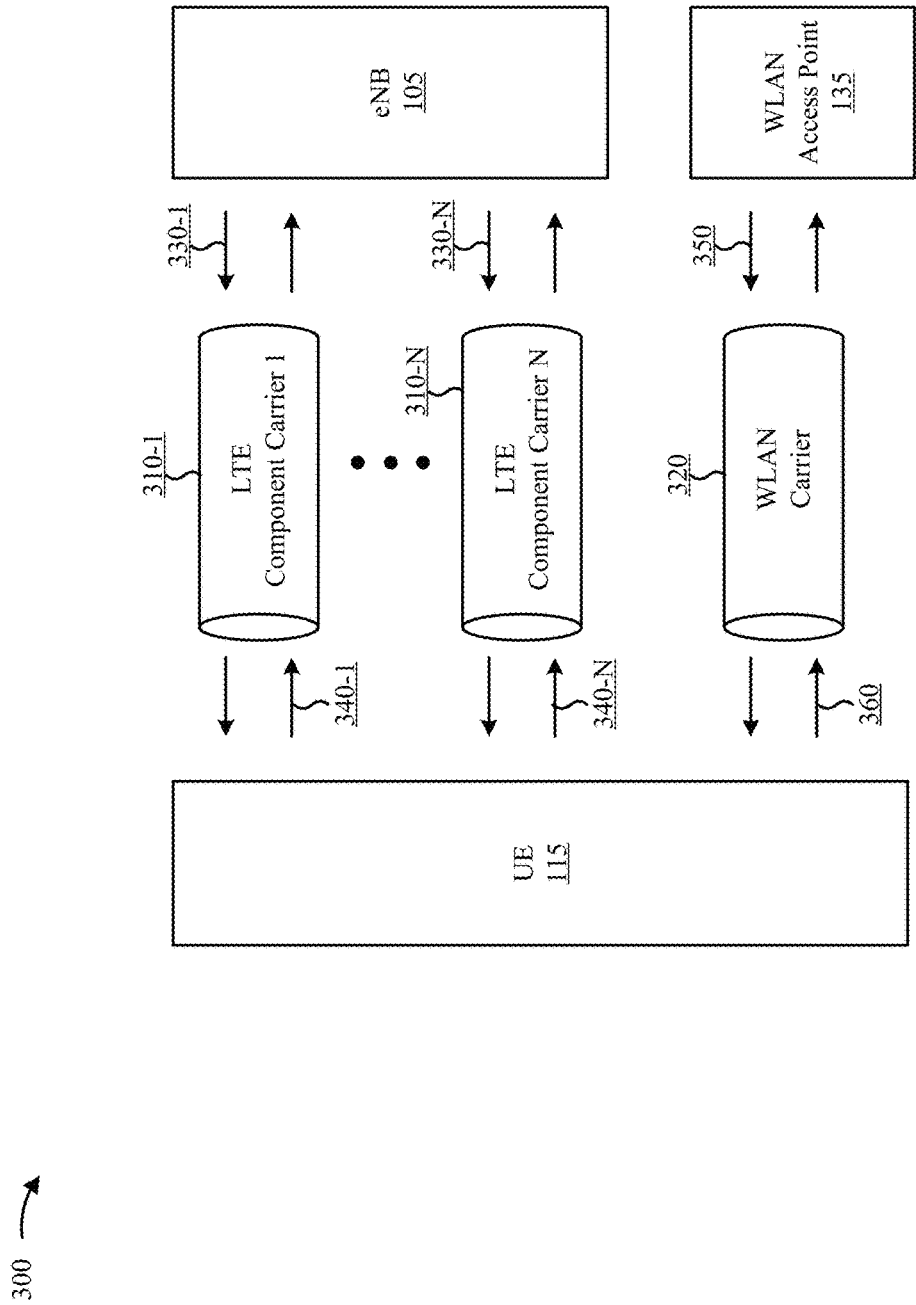
FIG. 3 is a block diagram illustrating an example of carrier aggregation at a UE, in accordance with various aspects of the present disclosure.

FIG. 3 is an illustration of an example 300 of carrier aggregation at user equipment, in accordance with various aspects of the present disclosure.

Carrier aggregation may occur in a system including a multi-mode UE 115, which can communicate with eNB 105 using one or more component carriers 310-1 through 310-N (N≥1) (sometimes referred to herein as $CC_1$ through $CC_N$), and with a WLAN access point 135 using WLAN carrier 320. In some aspects, eNB 105 may transmit information to UE 115 via forward (downlink) channels 330-1 through 330-N on LTE component carriers $CC_1$ through $CC_N$. Additionally, or alternatively, UE 115 may transmit information to eNB 105 via reverse (uplink) channels 340-1 through 340-N on LTE component carriers $CC_1$ through $CC_N$. In some aspects, WLAN access point 135 may transmit information to UE 115 via forward (downlink) channel 350 on WLAN carrier 320. Additionally, or alternatively, UE 115 may transmit information to WLAN access point 135 via reverse (uplink) channel 360 of WLAN carrier 320.

In multi-carrier operations, downlink control information (DCI) messages associated with different UEs 115 may be carried on multiple component carriers. For example, the DCI on a PDCCH may be included on the same component carrier that is configured to be used by UE 115 for PDSCH transmissions (e.g., same-carrier signaling). Additionally, or alternatively, the DCI may be carried on a component carrier different from the target component carrier used for PDSCH transmissions (e.g., cross-carrier signaling). In some aspects, a carrier indicator field (CIF), which may be semi-statically enabled, may be included in some or all DCI formats to facilitate the transmission of PDCCH control signaling from a carrier other than the target carrier for PDSCH transmissions (e.g., cross-carrier signaling).

In example 300, UE 115 may receive data from a single eNB 105. However, UEs 115 on a cell edge may experience high inter-cell interference which may limit data rates of communications. Multiflow allows UEs 115 to receive data from multiple (e.g., two) eNBs 105 simultaneously. Multiflow works by sending and receiving data from multiple eNBs 105 via two separate streams when UE 115 is in range of two cell towers in two adjacent cells at the same time. For example, UE 115 may communicate with two eNBs 105 concurrently when UE 115 is on the edge of cells associated with the eNBs 105. By scheduling two independent data streams to UE 115 from two different eNBs 105 at the same time, multiflow exploits uneven loading in high speed packet access (HSPA) networks. This helps improve the cell edge user experience while increasing network capacity. In one example, throughput data speeds for users at a cell edge may double. "Multiflow" is a feature of LTE/LTE-A that is similar to dual-carrier HSPA, however, there are differences. For example, dual-carrier HSPA does not allow for connectivity to multiple towers to connect simultaneously to a device.

As indicated above, FIG. 3 is provided as an example. Other examples are possible and may differ from what was described in connection with FIG. 3.

Figure 4A:
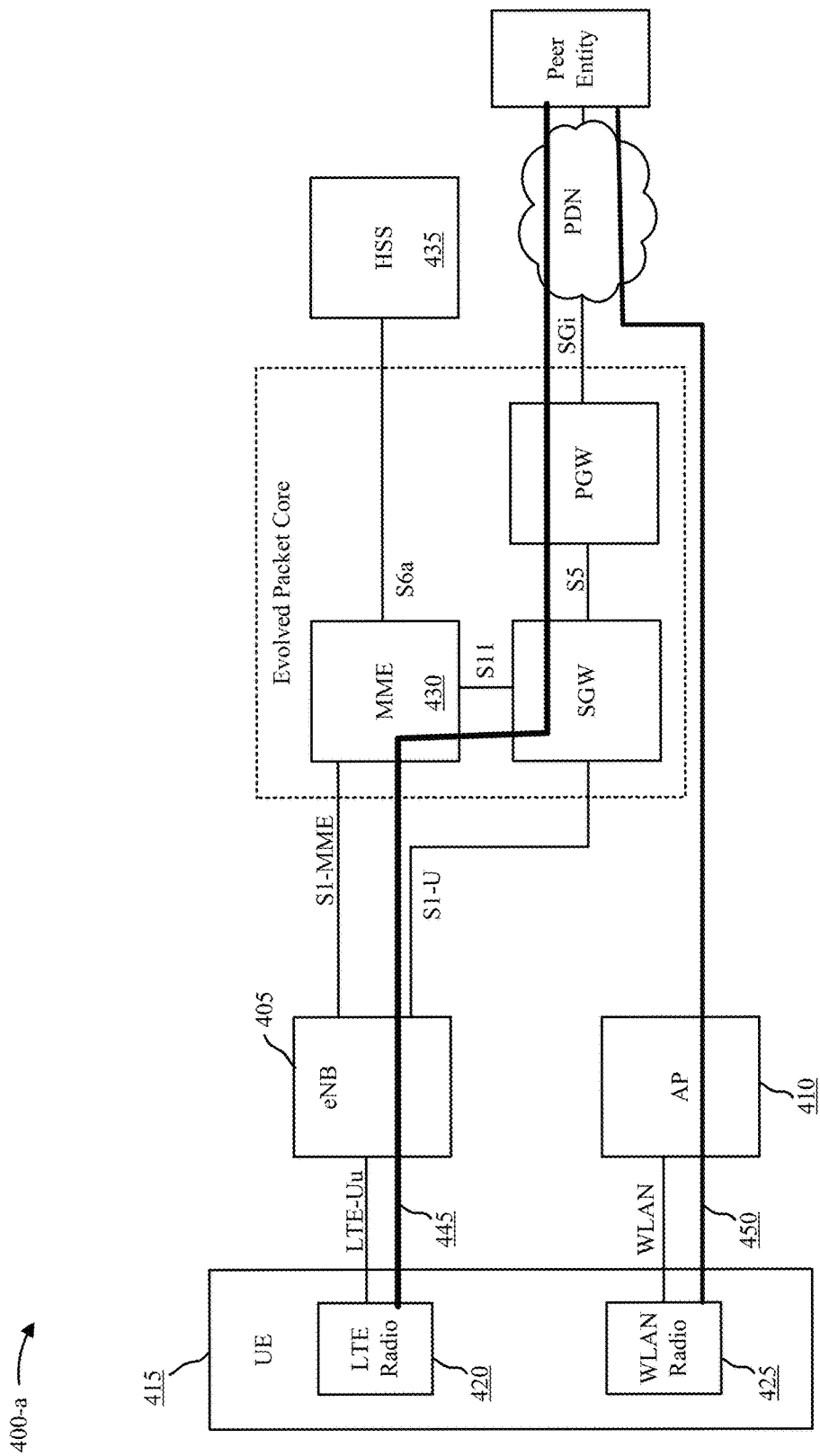
FIGS. 4A and 4B are block diagrams conceptually illustrating examples of data paths between a UE and a packet data network (PDN), in accordance with various aspects of the present disclosure.
Figure 4B:
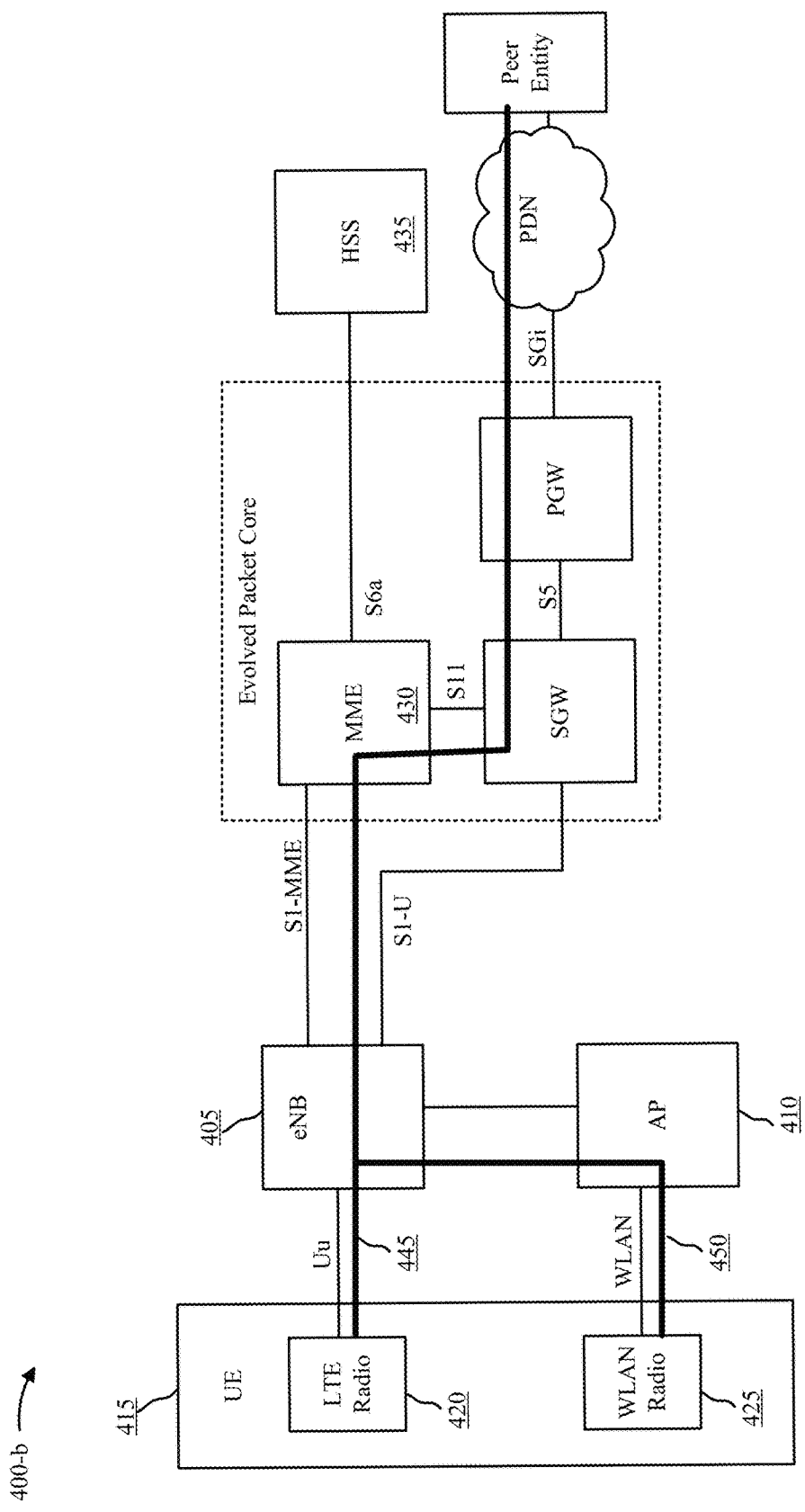

FIGS. 4A and 4B are block diagrams conceptually illustrating examples of data paths 445, 450 between a UE 415 and a PDN (e.g., the Internet), in accordance with various aspects of the present disclosure. The data paths 445, 450 are shown within the context of a wireless communication system 400-a, 400-b aggregating WLAN and LTE radio access technologies. In each example, the wireless communication system 400-a and 400-b, shown in FIGS. 4A and 4B, respectively, may include a multi-mode UE 415, an eNodeB 405, a WLAN AP 410, an evolved packet core (EPC), a PDN, and a peer entity. The EPC of each example may include a mobility management entity (MME) 430, a serving gateway (SGW), and a PDN gateway (PGW). A home subscriber system (HSS) 435 may be communicatively coupled with the MME 430. The UE 415 of each example may include an LTE radio 420 and a WLAN radio 425. These elements may represent aspects of one or more of their counterparts described above with reference to the previous Figures.

Referring specifically to FIG. 4A, the eNodeB 405 and AP 410 may be capable of providing the UE 415 with access to the PDN using the aggregation of one or more LTE component carriers or one or more WLAN component carriers. Using this access to the PDN, the UE 415 may communicate with the peer entity. The eNodeB 405 may provide access to the PDN through the evolved packet core (e.g., through data path 445), and the WLAN AP 410 may provide direct access to the PDN (e.g., through data path 450).

The MME 430 may be the control node that processes the signaling between the UE 415 and the EPC. Generally, the MME 430 may provide bearer and connection management. The MME 430 may, therefore, be responsible for idle mode UE tracking and paging, bearer activation and deactivation, and SGW selection for the UE 415. The MME 430 may communicate with the eNodeB 405 over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an S6a interface defined by the Evolved Packet System (EPS) architecture standardized by the 3GPP organization.

All user IP packets transmitted over LTE may be transferred through eNodeB 405 to the SGW, which may be connected to the PDN gateway over an S5 signaling interface and the MME 430 over an S11 signaling interface. The SGW may reside in the user plane and act as a mobility anchor for inter-eNodeB handovers and handovers between different access technologies. The PDN gateway may provide UE IP address allocation as well as other functions.

The PDN gateway may provide connectivity to one or more external packet data networks, such as PDN, over an SGi signaling interface. The PDN may include the Internet, an Intranet, an IP Multimedia Subsystem (IMS), a Packet-Switched (PS) Streaming Service (PSS), and/or other types of PDNs.

In the present example, user plane data between the UE 415 and the EPC may traverse the same set of one or more EPS bearers, irrespective of whether the traffic flows over data path 445 of the LTE link or data path 450 of the WLAN link. Signaling or control plane data related to the set of one or more EPS bearers may be transmitted between the LTE radio 420 of the UE 415 and the MME 430 of the EPC, by way of the eNodeB 405.

FIG. 4B illustrates an example system 400-b in which the eNodeB 405 and AP 410 are collocated or otherwise in high-speed communication with each other. In this example, EPS bearer-related data between the UE 415 and the WLAN AP 410 may be routed to the eNodeB 405, and then to the EPC. In this way, all EPS bearer-related data may be forwarded along the same path between the eNodeB 405, the EPC, the PDN, and the peer entity.

While aspects of FIG. 4A and FIG. 4B have been described with respect to LTE and WLAN, similar aspects regarding data aggregation or convergence may also be implemented with respect to UMTS, other local area networks, or other similar system or network wireless communications radio technologies. Furthermore, FIGS. 4A and 4B are provided as examples. Other examples are possible and may differ from what was described in connection with FIGS. 4A and 4B.

Figure 5A:
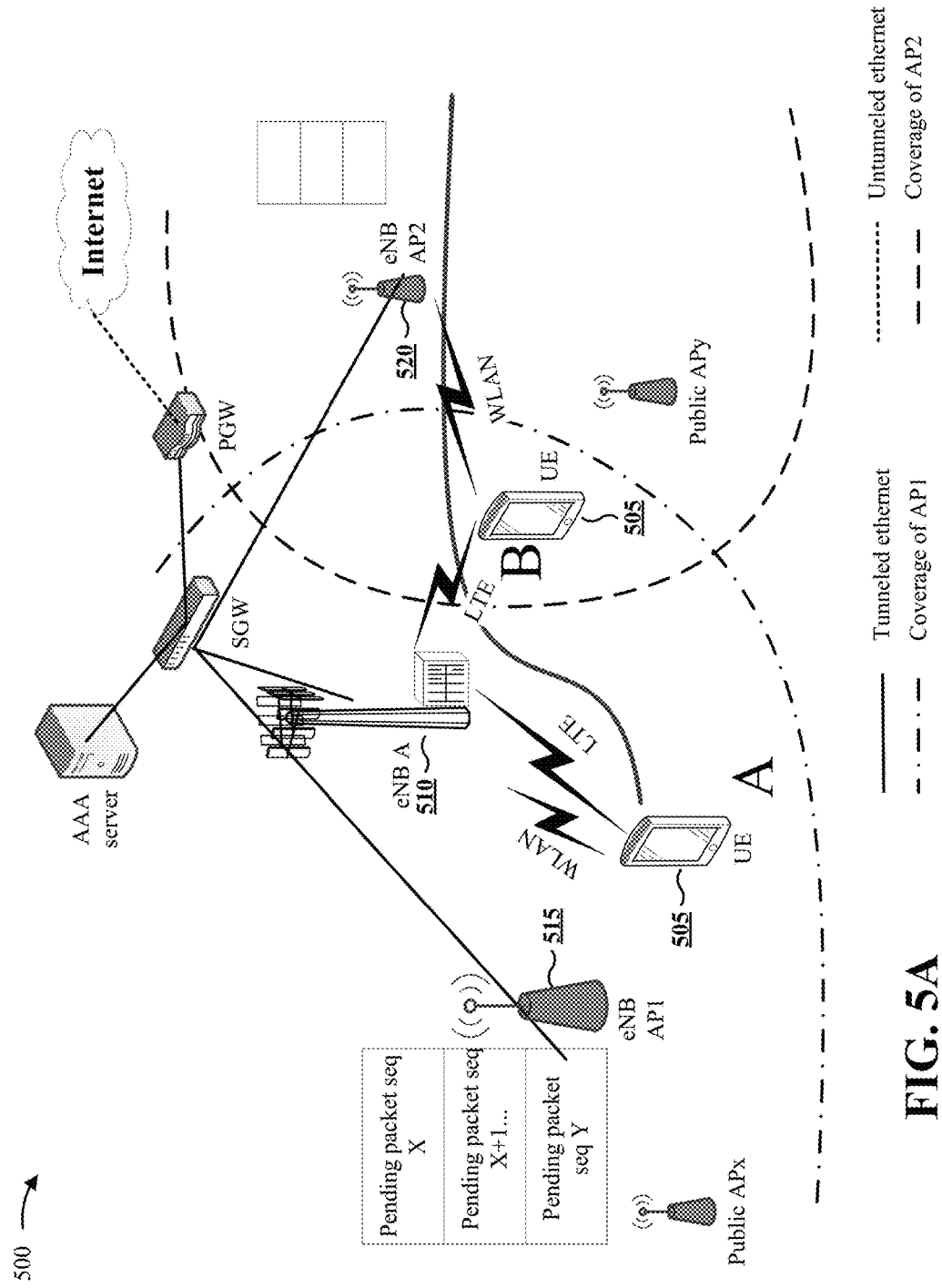
FIGS. 5A-5C are conceptual diagrams illustrating examples of managing a wireless wide area network (WWAN)-wireless local area network (WLAN) aggregation using a network-directed approach.
Figure 5B:
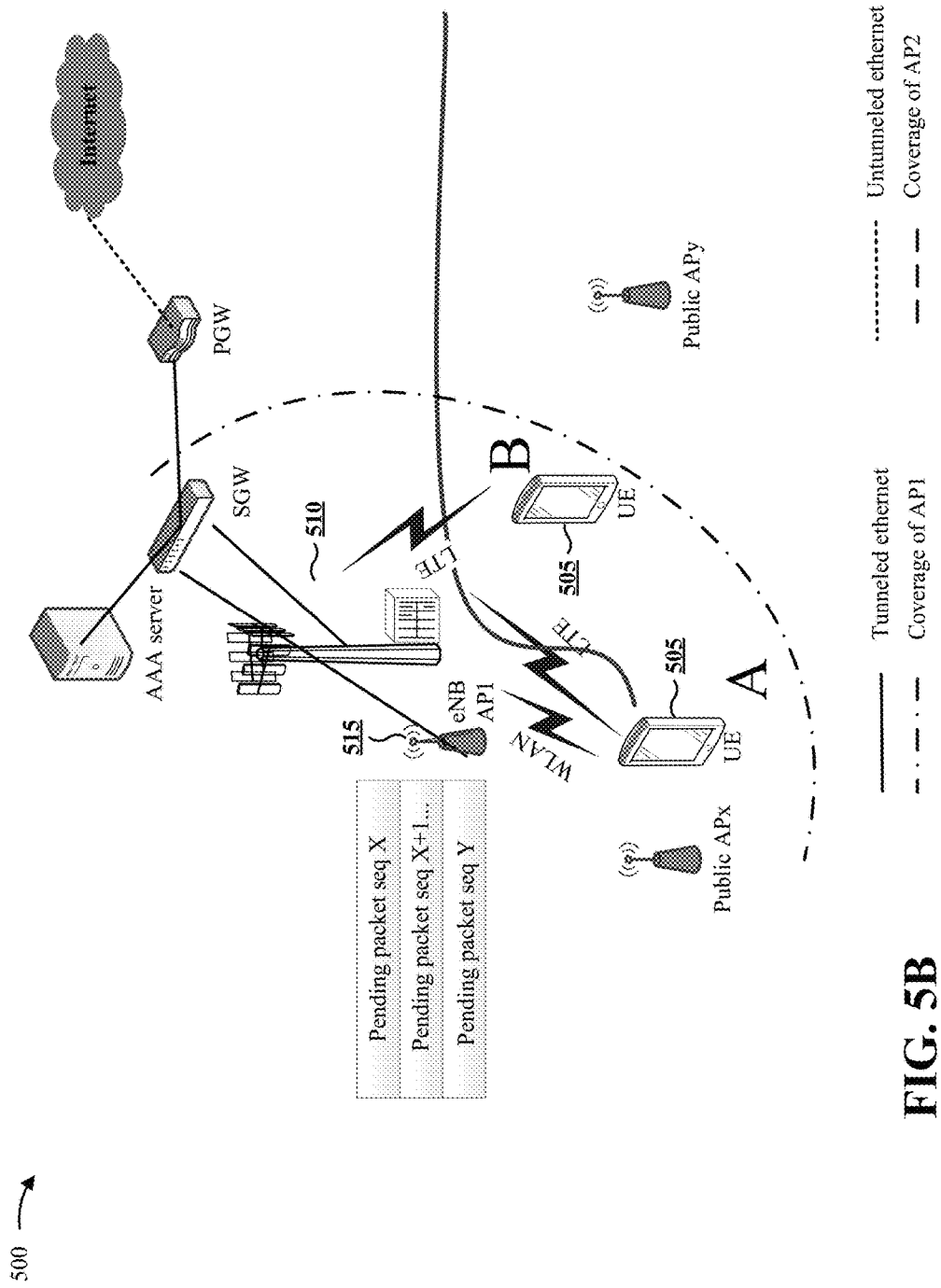
Figure 5C:
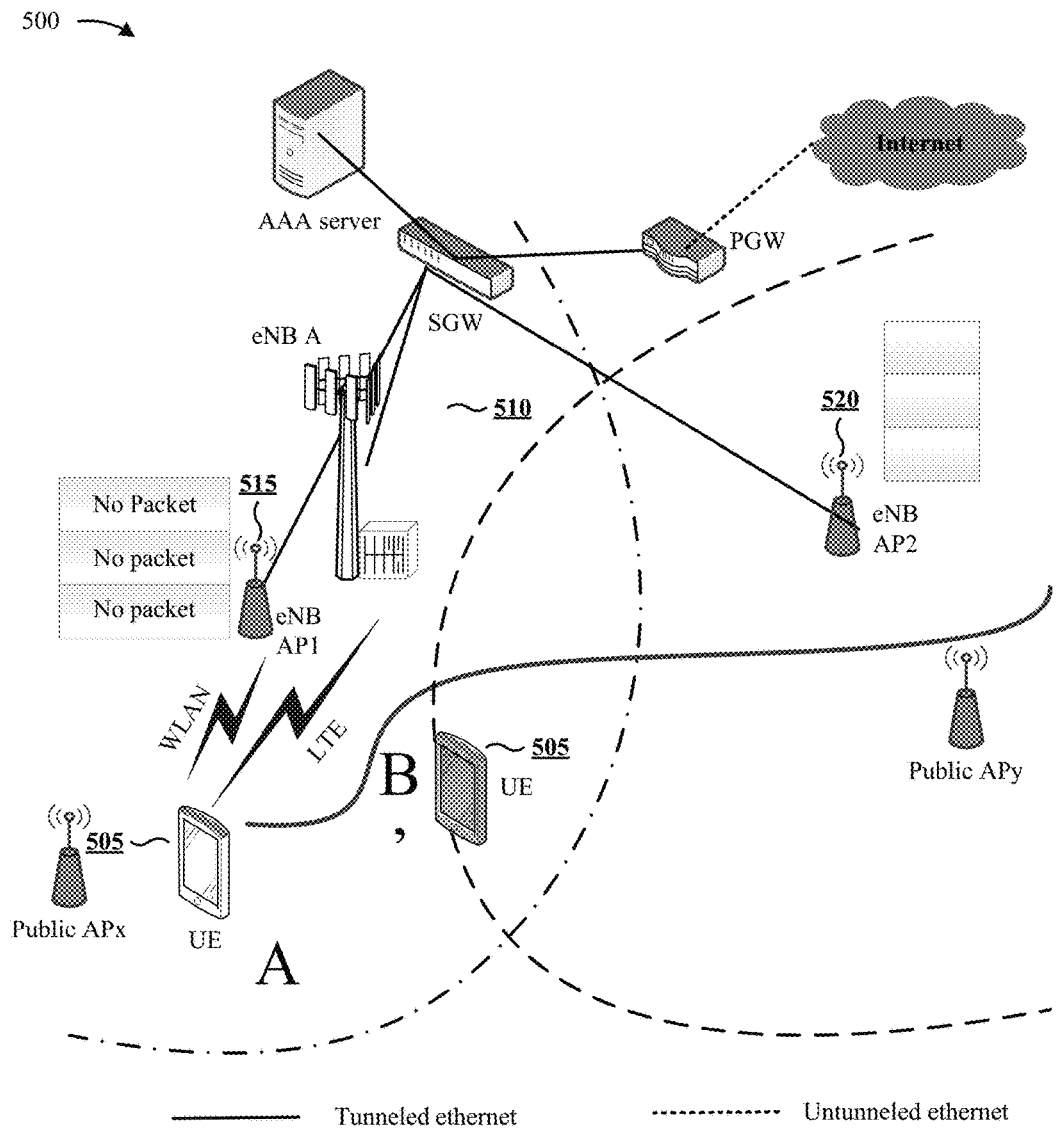

FIGS. 5A-5C are illustrations of an example 500 of managing WWAN-WLAN aggregation using a network-directed approach. As shown in FIG. 5A, a UE 505 may communicate with an eNB 510 using a first RAT, such as a WWAN RAT (e.g., shown as an LTE RAT). As further shown, the UE 505 may communicate with a serving AP 515, shown as eNB AP1 (e.g., a type of AP capable of supporting WWAN-WLAN aggregation, which may be connected to eNB 510 via tunneled Ethernet), using a second RAT, shown as a WLAN RAT (e.g., a Wi-Fi RAT). As shown, the UE 505 may be moved from a first location A to a second location B. At location B, a parameter (e.g., a signal strength) associated with a neighbor AP 520, shown as eNB AP2, may satisfy a threshold. In this case, the UE 505 may roam from the serving AP 515 to the neighbor AP 520.

As further shown in FIG. 5A, in a network-directed approach to WWAN-WLAN aggregation, the UE 505 may not have a mechanism to report the movement to eNB 510 prior to roaming to the neighbor AP 520. Thus, eNB 510 may continue to schedule packets (e.g., data packets) for delivery to UE 505 via serving AP 515, and may continue to route these packets (e.g., data packets) to serving AP 515. By the time UE 505 reports to the eNB 510 that the UE 505 is served by the neighbor AP 520, serving AP 515 may still have pending packets (e.g., data packets) that have not yet been delivered to UE 505. Serving AP 515 may not be able to deliver the packets to UE 505 before UE 505 loses a connection with serving AP 515, thereby resulting in packet loss.

As shown in FIG. 5B, in some cases, UE 505 may approach a proximity (e.g., the edge) of a coverage area of serving AP 515, without detecting a neighbor AP with which to connect. In a network-directed approach to WWAN-WLAN aggregation, the UE 505 may not have a mechanism to report to eNB 510 that the UE 505 is almost out of the coverage area of serving AP 515. Thus, eNB 510 may continue to schedule packets (e.g., data packets) for delivery to UE 505 via serving AP 515, and may continue to route these packets (e.g., data packets) to serving AP 515. When UE 505 moves out of the coverage area of serving AP 515, serving AP 515 may still have pending packets that have not yet been delivered to UE 505. Serving AP 515 may not be able to deliver the packets to UE 505 before UE 505 loses a connection with serving AP 515, thereby resulting in packet loss.

As shown in FIG. 5C, to alleviate packet loss in a network-directed approach to WWAN-WLAN aggregation, eNB 510 may receive periodic reports from UE 505 regarding serving AP 515 and/or neighbor AP(s) 520. However, generating periodic reports may increase a power consumption of UE 505. For example, when there are no WLAN packets to be delivered to UE 505, the UE 505 may remain in a power saving mode for the WLAN RAT. However, UE 505 may need to exit the power saving mode to generate a periodic report, which consumes power that could otherwise be saved if UE 505 did not need to generate the periodic report.

As indicated above, FIGS. 5A-5C are provided as examples. Other examples are possible and may differ from what was described with respect to FIGS. 5A-5C.

Techniques described herein relate to managing WWAN-WLAN aggregation that reduces or eliminates packet loss while conserving UE power. For example, in an LTE-WLAN aggregated network where a device is connected to the LTE eNB and a WLAN AP at the same time, the device may roam from a serving WLAN AP to a neighbor WLAN AP, or may go out of coverage from the serving WLAN AP. Techniques described herein manage WLAN roaming and out-of-coverage scenarios during LTE-WLAN aggregation to avoid packet loss during roaming and/or out-of-coverage scenarios, and to conserve power consumption by allowing a UE to enter or remain in power saving mode (e.g., when there is no better neighbor AP to which the UE may roam).

For example, when there is a better neighbor AP to which the UE may roam, techniques described herein may assist in switching from a serving AP to the better neighbor AP without packet loss. As another example, when there is no better neighbor AP available and the UE is going out of coverage of a serving AP, techniques described herein may assist in preventing the UE from exiting a power saving mode for the WLAN RAT, thereby conserving computing resources and power consumption. As another example, before a WLAN connection with the serving AP is lost, techniques described herein may assist in delivering the packets from the serving AP and switching to an LTE-only mode, thereby avoiding packet loss.

Figure 6A:
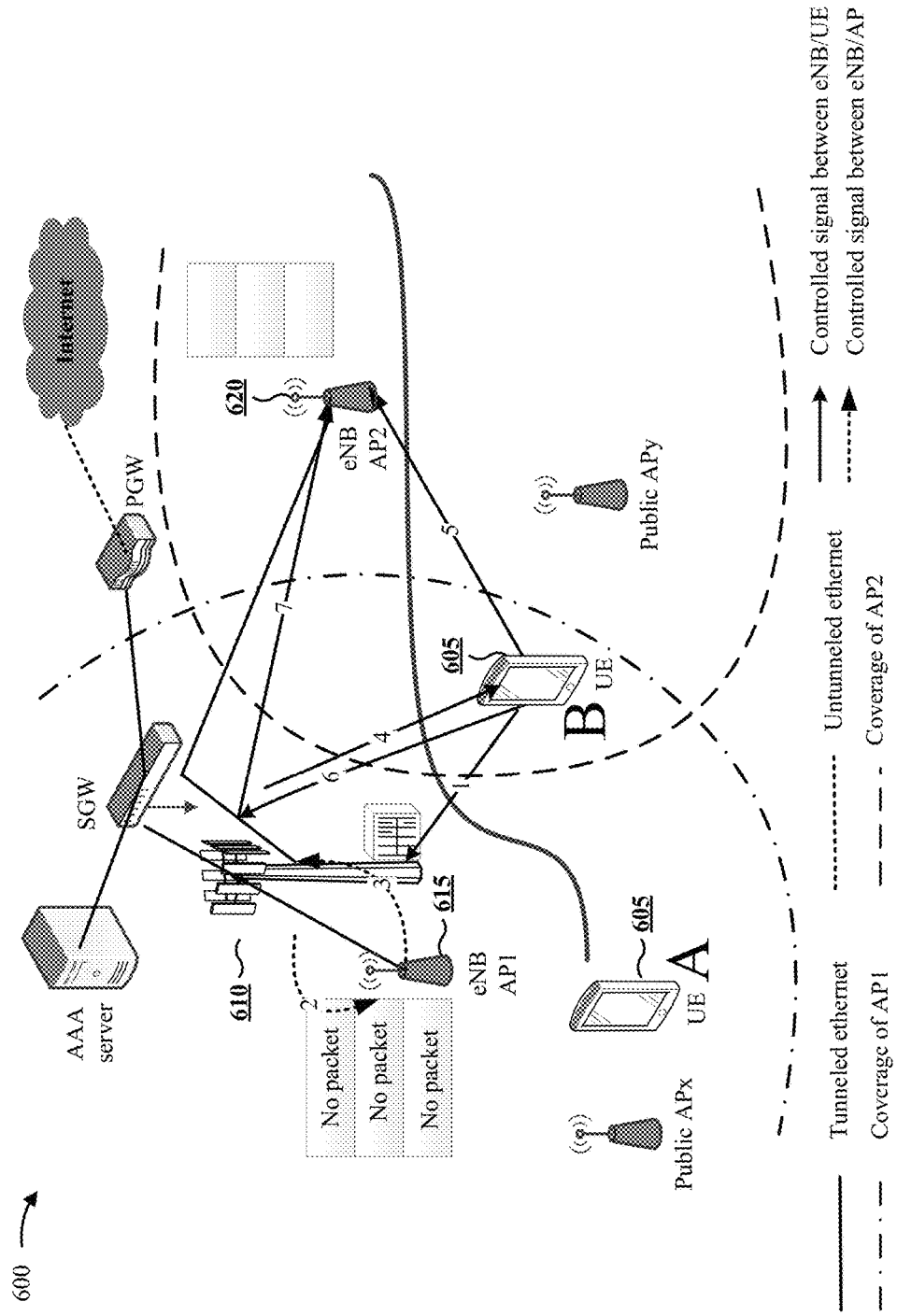
FIGS. 6A-6C are conceptual diagrams illustrating examples of managing WWAN-WLAN aggregation, in accordance with various aspects of the present disclosure.
Figure 6B:
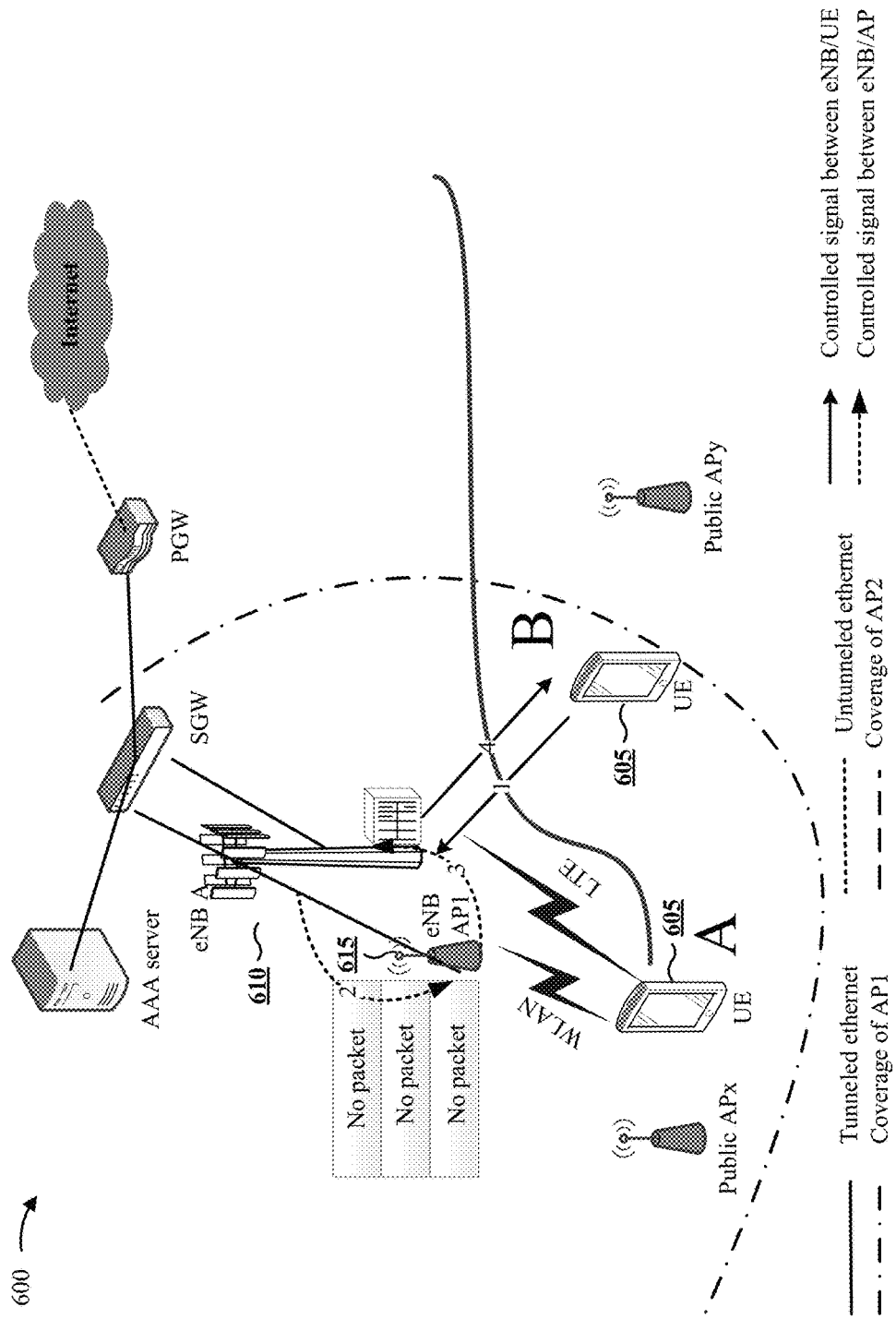
Figure 6C:
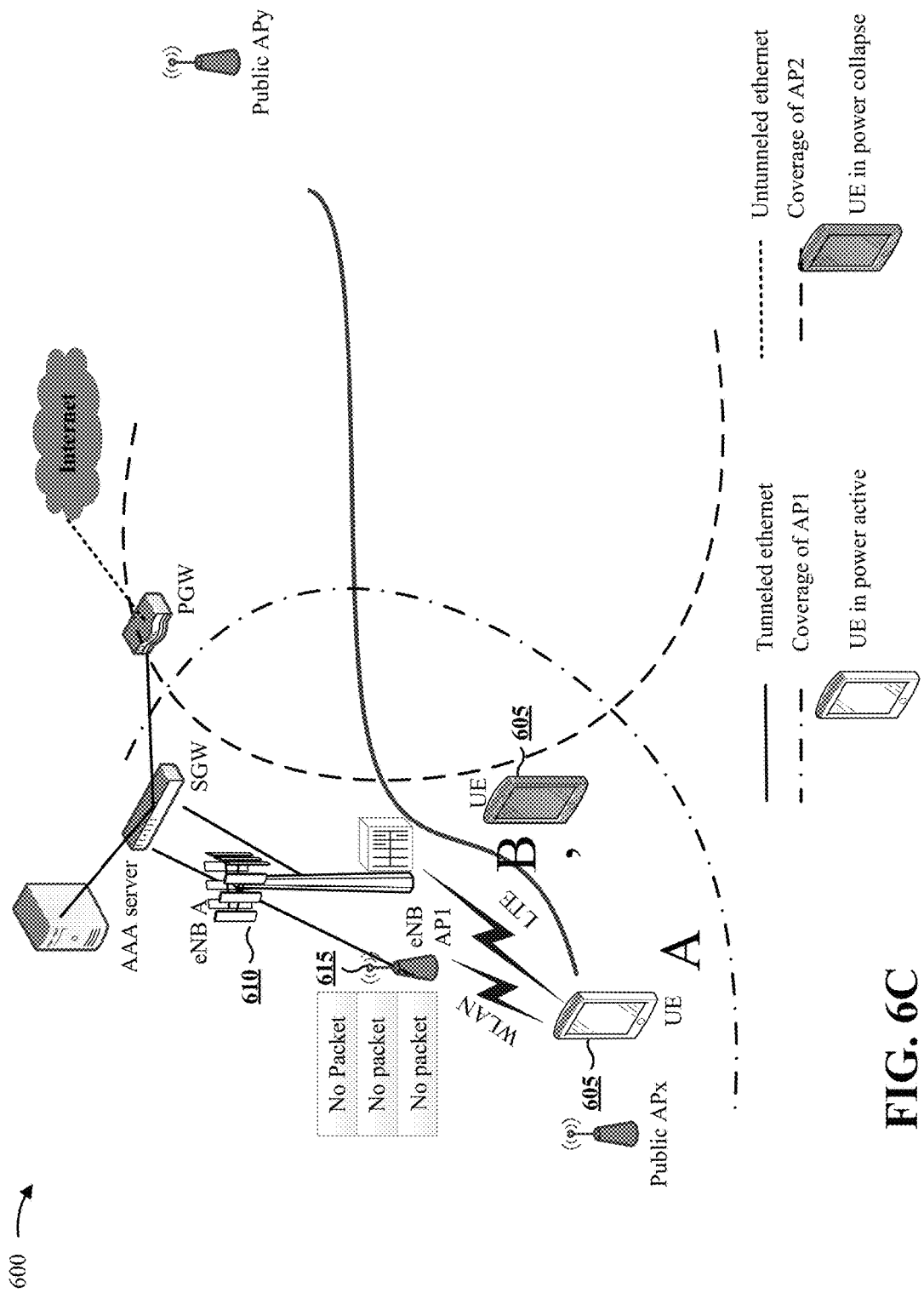

FIGS. 6A-6C are illustrations of an example 600 of managing WWAN-WLAN aggregation, in accordance with various aspects of the present disclosure. As shown in FIG. 6A, a UE 605 may communicate with an eNB 610 via a first RAT, such as a WWAN RAT (e.g., LTE). As further shown, the UE 605 may communicate with a serving AP 615, shown as eNB AP1, via a second RAT, such as a WLAN RAT (e.g., Wi-Fi). UE 605 may correspond to any of the UEs shown in other Figures of the present disclosure, eNB 610 may correspond to any of the eNBs shown in other Figures of the present disclosure, serving AP 615 (e.g., shown as eNB AP1) may correspond to any of the serving APs shown in other Figures of the present disclosure, and neighbor AP 620 (e.g., shown as eNB AP2) may correspond to any of the neighbor APs shown in other Figures of the present disclosure. As shown, the UE 605 may be moved from a first location A to a second location B. At location B, a parameter (e.g., signal strength, a throughput, a modulation coding scheme (MCS), a packet error rate (PER), a received signal strength indicator (RSSI), etc.) associated with a neighbor AP 620, shown as eNB AP2, may satisfy a threshold (e.g., a roaming threshold, described as Threshold4 in connection with FIG. 7, below). Also, at location B, a parameter (e.g., a signal strength, a throughput, an MCS, a PER, an RSSI, etc.) associated with serving AP 615, may fall below a threshold (e.g., an association threshold, described as Threshold2 in connection with FIG. 7, below). In this case, the UE 605 may generate a message, referred to herein as a 'Better Neighbor Found' message. This message may indicate to the eNB 610 that the UE 605 has found a better neighbor AP 620 to which to roam (e.g., a neighbor AP 620 with a stronger signal strength, higher throughput, higher MCS, lower PER, higher RRSI, etc. than serving AP 615). In some aspects, this message may identify a plurality of roam-able APs associated with the parameters (e.g., using an SSID, BSSID, channel parameter, RSSI, preferred score, etc). The UE 605 may provide this message to eNB 610, as shown by control signal 1 in FIG. 6A.

As shown, based at least in part on receiving the message, eNB 610 may stop scheduling packets to serving AP 615, as shown by control signal 2 in FIG. 6A. Serving AP 615, may transmit packets that have already been scheduled, to UE 605, before UE 605 roams to the better neighbor AP 620. After serving AP 615 transmits the packets, serving AP 615 may notify eNB 610 that the packets have been transmitted to UE 605, as shown by control signal 3 in FIG. 6A. Based at least in part on receiving this notification, eNB 610 may instruct UE 605 to roam to neighbor AP 620, as shown by control signal 4 in FIG. 6A. UE 605 may connect to neighbor AP 620 (e.g., and may disconnect from serving AP 615), as shown by control signal 5 in FIG. 6A. UE 605 may confirm successful roaming to eNB 610, as shown by control signal 6 in FIG. 6A. After receiving the confirmation, eNB 610 may schedule packets for delivery to UE 605 via neighbor AP 620, as shown by control signal 7 in FIG. 6A.

In this way, the roaming procedure may be split, using WWAN-WLAN aggregation management techniques described herein, between UE 605 and eNB 610. These two entities may communicate to ensure a smooth transition from serving AP 615 to neighbor AP 620 with reduced or eliminated packet loss. For example, WWAN-WLAN management techniques described herein may permit the eNB 610 to control timing of roaming of UE 605 from a serving AP 615 to a neighbor AP 620, thereby reducing or eliminating packet loss without using periodic measurement reports that consume UE battery power. Some possible aspects of roaming from serving AP 615 to neighbor AP 620 will now be described in more detail.

In some aspects, UE 605 may be associated with a serving base station, such as eNB 610, which may communicate with UE 605 via a first RAT, such as a WWAN RAT (e.g., an LTE RAT). UE 605 may also be associated with a serving AP, such as serving AP 615, which may communicate with UE 605 via a second RAT, such as a WLAN RAT (e.g., a Wi-Fi RAT). The serving AP 615 may be identified by an AP identifier, such as a basic service set identifier (BSSID), a media access control (MAC) address, or the like.

In some aspects, eNB 610 may identify APs to which the UE 605 is permitted to roam, which may be referred to as roam-able APs. As an example, the roam-able APs may be identified using an AP identifier (e.g., a BSSID), a WLAN identifier (e.g., a service set identifier (SSID)), or the like. In some aspects, the eNB 610 may provide a list of roam-able APs to UE 605. In some aspects, the eNB 610 may prioritize the list to indicate an order in which UE 605 is to attempt to connect to the roam-able APs.

Additionally, or alternatively, the eNB 610 may configure the UE 605 to roam to any AP (e.g., BSSID) that satisfies one or more parameters and/or conditions, such as a measured throughput, a type of modulation and encoding scheme (MCS), a preferred radio band (e.g., 5 Ghz), a signal strength (e.g., a received signal strength indicator (RSSI)) that satisfies a roaming threshold, or the like. Additionally, or alternatively, eNB 610 may configure UE 605 by providing a set of BSSIDs for roam-able APs along with the associated parameters (e.g., using an SSID or BSSID, channel parameter, etc). The UE 605 may use this information to reduce the time to search for roam-able APs. In some aspects, the set of BSSIDs may be routable via a common data path (e.g., to UEs, to other eNBs, etc.). The UE 605 may automatically roam within a BSSID subset (e.g., based at least in part on one or more parameters associated with an AP), and may notify eNB 610 when roaming between APs. Additionally, or alternatively, eNB 610 may configure UE 605 with a blacklist of APs (e.g., BSSIDs) to which the UE 605 is not permitted to roam. UE 605 may use the blacklist to exclude blacklisted APs from the roam-able APs. In some aspects, the UE 605 may maintain the blacklist using a roaming history, and may report the UE-maintained blacklist to eNB 610. In some aspects, eNB 610 may maintain the blacklist, and the blacklist may be reported within an LTE cell.

When UE 605 determines that a parameter associated with serving AP 615 is less than or equal to an association threshold (e.g., Threshold2, described in more detail below in connection with FIG. 7), and/or that a parameter associated with neighbor AP 620 is greater than or equal to a roaming threshold (e.g., Threshold4, described in more detail below in connection with FIG. 7), UE 605 may generate message (e.g., a 'Better Neighbor Found' message), and may provide the message to eNB 610. In some aspects, the message may include information that identifies neighbor AP(s) 620 with a parameter that satisfies the threshold. In some aspects, the message may include information that identifies a plurality of neighbor APs 620. The parameter may include, for example, SSID, BSSID, a signal parameter (e.g., RSSI), a channel parameter, a WLAN throughput parameter, or the like. In some aspects, UE 605 may receive information that identifies the parameter and/or the threshold from eNB 610.

When eNB 610 receives the message (e.g., the 'Better Neighbor Found' message), eNB 610 may select a target neighbor AP 620 to which the UE 605 is to connect. In some aspects, eNB 610 may select the target neighbor AP 620 based at least in part on a connectivity of neighbor AP(s) 620, a load (e.g., basic service set (BSS) load) associated with neighbor AP(s) 620, or the like. Additionally, or alternatively, eNB 610 may permit the UE 605 to select the target neighbor AP 620 by providing a message that instructs UE 605 to select any neighbor AP 620 (e.g., a 'Roam Anywhere' message). In some aspects, if the UE 605 does not receive a connection instruction (e.g., to connect to a neighbor AP 620 or to select a neighbor AP for a connection) within a threshold period of time, the UE 605 may continue to monitor parameter(s) of neighbor APs 620, and may provide another 'Better Neighbor Found' message to eNB 610.

In some aspects, eNB 610 may determine that serving AP 615 has transmitted scheduled packets to UE 605 before providing the message that instructs UE 605 to select and/or roam to a neighbor AP 620. For example, eNB 610 may prevent additional packets from being scheduled on serving AP 615, and/or may receive an indication from serving AP 615 when previously scheduled packets have been transmitted to UE 605 (e.g., that serving AP 615 has zero pending packets for UE 605). After receiving this indication, eNB 610 may provide the message that instructs UE 605 to select and/or roam to a neighbor AP 620. UE 605 may connect to neighbor AP 620 using a re-association procedure, and may provide a confirmation to eNB 610 upon successful connection (e.g., using an 'associationComplete' message). In some aspects, the confirmation may identify the neighbor AP 620 to which UE 605 has connected. Additionally, or alternatively, neighbor AP 620 may provide a confirmation to eNB 610 upon successful connection with UE 605. In some aspects, the confirmation may identify the UE 605 to which the neighbor AP 620 has connected. In some aspects, eNB 610 may schedule packets for delivery to UE 605 via neighbor AP 620 after receiving the confirmation (e.g., from UE 605 and/or neighbor AP 620). In this way, a seamless handover from serving AP 615 to neighbor AP 620 may be achieved without loss of packets.

In some aspects, a similar procedure may be employed for UE 605 to initially connect to an AP when UE 605 is not currently connected to any AP. For example, UE 605 may be operating in a WWAN-only mode (e.g., an LTE-only mode), and may employ the technique described above to determine a neighbor AP 620 with which to connect (e.g., when UE 605 is not connected to a serving AP 615).

For example, UE 605 may be associated with a serving base station, such as eNB 610, which may communicate with UE 605 via a first RAT, such as a WWAN RAT (e.g., an LTE RAT). UE 605 may or may not be associated with a serving AP (e.g., identified by a WLAN BSSID). As described above, in some aspects, eNB 610 may identify APs to which the UE 605 is permitted to connect, which may be referred to as usable APs. In some aspects, eNB 610 may provide a list of usable APs to UE 605. In some aspects, the eNB 610 may prioritize the list to indicate an order in which UE 605 is to attempt to connect to the usable APs.

Additionally, or alternatively, the eNB 610 may configure the UE 605 to connect to any usable AP (e.g., BSSID) that satisfies one or more parameters and/or conditions, such as a measured throughput, a type of modulation and encoding scheme (MCS), a signal strength (e.g., a received signal strength indicator (RSSI)) that satisfies a threshold, or the like. Additionally, or alternatively, eNB 610 may configure UE 605 by providing a set of BSSIDs for usable APs. In some aspects, the set of BSSIDs may be routable via a common data path (e.g., to UEs, to other eNBs, etc.). The UE 605 may automatically connect to a usable AP associated with an AP having a BSSID within a BSSID subset (e.g., based at least in part on one or more parameters associated with an AP), and may notify eNB 610 when a connection is established. Additionally, or alternatively, eNB 610 may configure UE 605 with a blacklist of APs (e.g., BSSIDs) to which the UE 605 is not permitted to connect. In some aspects, the eNB 610 may maintain the blacklist, and the blacklist may be reported within an LTE cell.

UE 605 may periodically attempt to detect usable APs. When there are no usable APs detected by UE 605, UE 605 may not provide a message (e.g., a periodic measurement report) to eNB 610 and may enter into a power saving mode. When UE 605 determines that a parameter associated with a usable AP 620 (e.g., neighbor AP 620) is greater than or equal to a threshold (e.g., a usable area threshold, such as Threshold1, described in more detail below in connection with FIG. 7), UE 605 may generate message (e.g., a 'Usable AP' message), and may provide the message to eNB 610. In some aspects, the message may include information that identifies usable AP(s) with a parameter that satisfies the threshold. In some aspects, the message may include information that identifies a plurality of usable APs. The parameter may include for example, SSID, BSSID, a signal parameter (e.g., RSSI), channel parameter, a WLAN throughput parameter, or the like. In some aspects, UE 605 may receive information that identifies the parameter and/or the threshold from eNB 610.

When eNB 610 receives the message (e.g., the 'Usable AP' message), eNB 610 may select a target usable AP to which the UE 605 is to connect. In some aspects, eNB 610 may select the target usable AP based at least in part on a connectivity of usable AP(s), a load associated with usable AP(s), or the like. Additionally, or alternatively, eNB 610 may permit the UE 605 to select the target usable AP by providing a message that instructs UE 605 to select any usable AP (e.g., a 'Connect Anywhere' message). In some aspects, if the UE 605 does not receive a connection instruction (e.g., to connect to a usable AP or to select a usable AP for a connection) within a threshold period of time, the UE 605 may enter into a power saving mode and may continue to monitor parameter(s) of usable APs, and may provide another 'Usable AP' message to eNB 610 after a threshold period of time.

In some aspects, UE 605 may connect to a usable AP using an association procedure, and may provide a confirmation to eNB 610 upon successful connection. In some aspects, the confirmation may identify the usable AP to which UE 605 has connected. Additionally, or alternatively, the usable AP may provide a confirmation to eNB 610 upon successful connection with UE 605. In some aspects, the confirmation may identify the UE 605 to which the usable AP has connected. In some aspects, eNB 610 may schedule packets for delivery to UE 605 via the usable AP after receiving the confirmation (e.g., from UE 605 and/or the usable AP). In this way, WWAN-WLAN aggregation management techniques described herein may assist with seamless connection to a usable AP while allowing UE 605 to be in a power saving mode until a usable AP is available.

In some aspects, the eNB may configure a measurement object that indicates to the UE 605 when the UE 605 is to provide a 'Usable AP' message. The measurement object may indicate, for example, one or more WLAN identifiers (e.g., SSIDs), one or more WLAN AP identifiers (e.g., BSSIDs), one or more access network query protocol (ANQP) identifiers, or the like, which the UE 605 may use when searching for usable/neighbor APs to which to connect. Additionally, or alternatively, the measurement object may indicate a parameter and/or a threshold to be used in the search.

The UE 605 may use the measurement object when searching for usable/neighbor APs to which to connect. For example, when UE 605 detects a usable/neighbor AP associated with a parameter greater than a usable area threshold (e.g., Threshold1, described in more detail below in connection with FIG. 7), UE 605 may report the usable/neighbor AP to eNB 610 if the usable/neighbor AP matches one or more identifiers received from eNB 610.

In some aspects, the measurement object may indicate a number of messages (e.g., reports) that UE 605 is to provide to eNB 610 after the threshold is met. In this case, the UE 605 may monitor parameters of usable/neighbor APs a number of times indicated in the measurement object, and may provide a corresponding number of messages to the eNB 610 at intervals. The eNB 610 may use information from multiple messages to select a usable/neighbor AP to which the UE 605 is to connect. In some aspects, after the number of messages are sent, the measurement object may become dormant and may not be used until the UE 605 becomes disconnected from the WLAN AP and searches for another usable AP.

By indicating a number of messages (e.g., reports) to be provided, the eNB 610 may conserve computing resources of the UE 605 by limiting the number of messages provided by the UE 605, rather than receiving ongoing periodic messages (e.g., periodic measurement reports) from the UE 605. For example, if the eNB 610 does not initiate a WLAN connection after the number of messages are sent, the UE 605 may stop sending messages, thereby conserving power. Furthermore, the eNB 610 may conserve resources because the eNB 610 may not have to reconfigure the management object. For example, the eNB 610 may maintain the management object in order to discover new connection opportunities for the UE 605.

As shown in FIG. 6B, WWAN-WLAN aggregation management techniques described herein may reduce or eliminate packet loss by transmitted scheduled packets from serving AP 615 (e.g., shown as eNB AP1) and preventing additional packets from being scheduled on serving AP 615 when UE 605 approaches an edge of a coverage area associated with serving AP 615 and there are no available neighbor APs. As shown, UE 605 may communicate with eNB 610 via a first RAT, such as a WWAN RAT (e.g., LTE). As further shown, the UE 605 may communicate with a serving AP 615, shown as eNB AP1, via a second RAT, such as a WLAN RAT (e.g., Wi-Fi).

As shown, the UE 605 may be moved from a first location A to a second location B. At location B, a parameter associated with serving AP 615 may fall below a threshold (e.g., a disassociation threshold, described as Threshold3 in connection with FIG. 7, below). The parameter may include, for example, a signal parameter (e.g., RSSI), a WLAN throughput parameter, or the like. In some aspects, UE 605 may receive information that identifies the parameter and/or the threshold from eNB 610. Based at least in part on the parameter falling below the threshold, the UE 605 may generate a message, referred to herein as an 'Imminent Disconnect' message, as shown by control signal 1 in FIG. 6B. This message may indicate that the UE 605 is nearing a boundary of a coverage area associated with serving AP 615. The UE 605 may provide this message to eNB 610.

As shown, based at least in part on receiving the message, the eNB 610 may prevent additional packets from being scheduled on serving AP 615, as shown by control signal 2 in FIG. 6B. Additionally, or alternatively, the eNB 610 may receive an indication from serving AP 615 when previously scheduled packets have been transmitted to UE 605, as shown by control signal 3 in FIG. 6B. After receiving this indication, eNB 610 may provide a message that instructs UE 605 to disconnect from serving AP 615, as shown by control signal 4 in FIG. 6B. Additionally, or alternatively, UE 605 may disconnect from serving AP 615 after a threshold amount of time has elapsed (e.g., after providing the 'Imminent Disconnect' message to eNB 610). Additionally, or alternatively, eNB 610 may enter into an LTE-only mode. In this way, a WWAN-WLAN aggregation management techniques described herein may reduce or eliminate packet loss by delivering packets from serving AP 615 to UE 605 prior to disconnecting UE 605 from serving AP 615. For example, WWAN-WLAN aggregation management may permit the eNB 610 to control timing of a switch from an LTE-only mode to an LTE-WLAN aggregation mode, thereby reducing or eliminating packet loss without using periodic measurement reports that consume UE battery power.

As shown in FIG. 6C, WWAN-WLAN aggregation management may save UE battery power by ensuring that UE 605 does not have to wake up periodically to generate a message (e.g., a report), particularly when there is no better neighbor AP to which UE 605 may connect. As shown, UE 605 may communicate with eNB 610 via a first RAT, such as an LTE RAT. As further shown, the UE 605 may communicate with a serving AP 615, shown as eNB AP1, via a second RAT, such as a WLAN RAT. In this case, the UE 605 may not generate a periodic message (e.g., a periodic measurement report) when there is no better neighbor AP to which to connect, so long as UE 605 remains within a usable area of serving AP 615 (e.g., where a parameter associated with serving AP 615 satisfies a threshold).

As shown, the UE 605 may be moved from a first location A to a second location B'. At location B', a signal strength or another parameter associated with serving AP 615 may fall below an association threshold (e.g., Threshold2, described in more detail below in connection with FIG. 7). The parameter may include for example, a signal parameter (e.g., RSSI), a WLAN throughput parameter, or the like. In some aspects, UE 605 may receive information that identifies the parameter and/or the threshold from eNB 610. When the parameter falls below the threshold, the UE 605 may prevent a message from being generated when there is no neighbor AP to which the UE 605 may connect. In this case, UE 605 may enter a power saving mode until a parameter associated with serving AP 615 and/or a neighbor AP satisfies a threshold (e.g., until UE 605 detects an RSSI breach event). In this way, WWAN-WLAN aggregation management may conserve battery power of UE 605.

As indicated above, FIGS. 6A-6C are provided as examples. Other examples are possible and may differ from what was described with respect to FIGS. 6A-6C.

Figure 7:
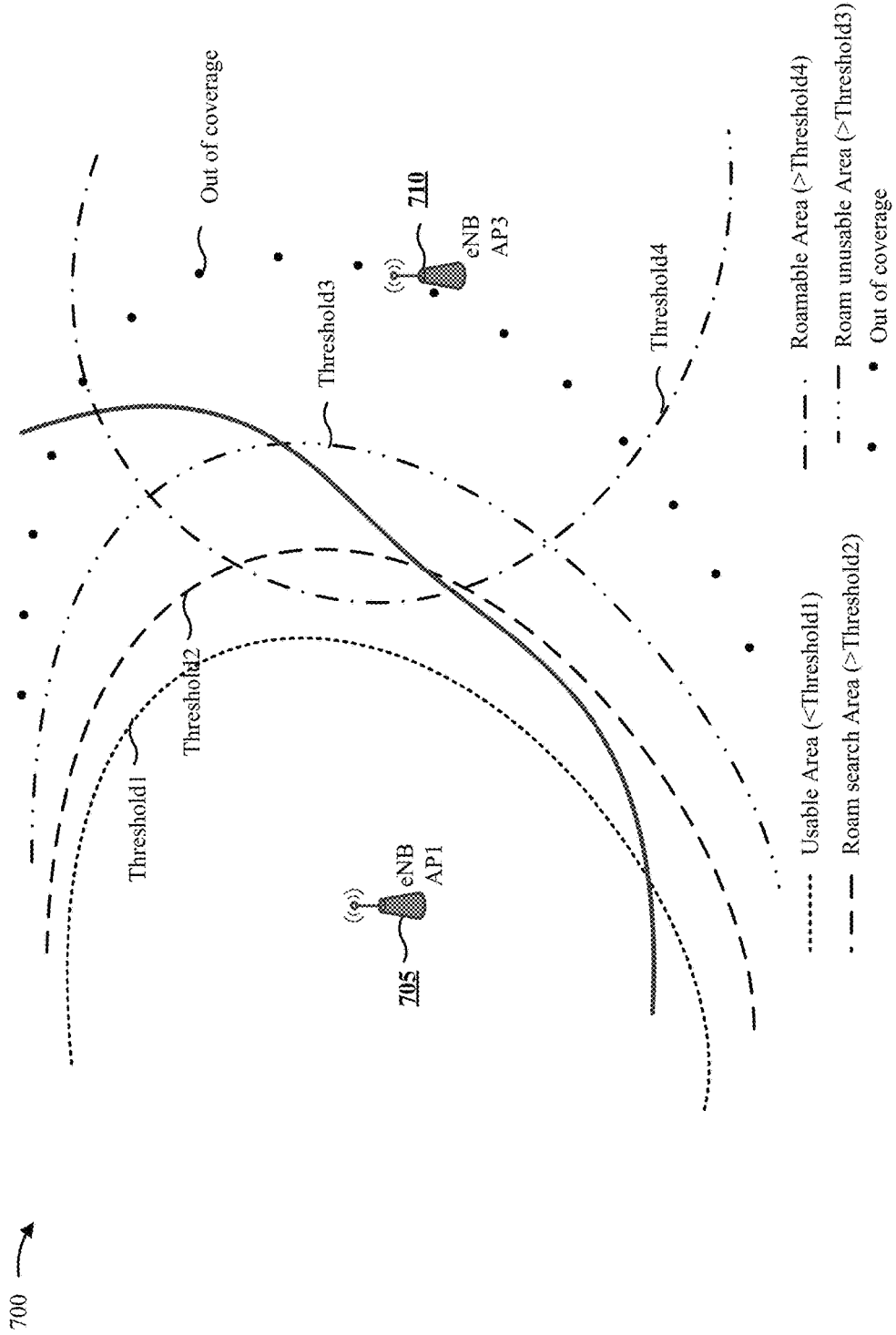
FIG. 7 is a conceptual diagram of example thresholds that may trigger a message from a UE in WWAN-WLAN aggregation management, in accordance with various aspects of the present disclosure.

FIG. 7 is a diagram of example thresholds that may trigger a message from a UE in WWAN-WLAN aggregation management, in accordance with various aspects of the present disclosure. For the purpose of FIG. 7, a UE may be connected to serving AP 705, and may potentially roam to neighbor AP 710. As shown, a first threshold, shown as Threshold1, may be associated with a usable area of serving AP 705. Threshold1 may be referred to herein as a usable area threshold. When a parameter (e.g., a signal strength, a WLAN throughput, etc.) associated with serving AP 705 is greater than Threshold1, serving AP 705 is considered able to provide a stable WLAN connection (e.g., stable WLAN throughput). In some aspects, a UE may use Threshold1 to determine whether to generate a 'Usable AP' message, which may cause an eNB to instruct the UE to connect to a usable AP associated with the parameter that is greater than Threshold1, or may permit the UE to select a usable AP with which to connect, as described elsewhere herein.

As further shown, a second threshold, shown as Threshold2, may be associated with a roaming search area. Threshold2 may be referred to herein as an association threshold. When a parameter associated with serving AP 705 is less than Threshold2 (and/or a parameter associated with neighbor AP 710 is greater than Threshold4, as discussed below), the UE may generate a 'Better Neighbor Found' message, and may provide this message to an eNB. In this case, the eNB may instruct the UE to roam to a neighbor AP 710, or may permit the UE to select and roam to any neighbor AP, as described elsewhere herein.

As further shown, a third threshold, shown as Threshold3, may be associated with a degraded coverage area of serving AP 705. Threshold3 may be referred to herein as a disassociation threshold. When a parameter associated with serving AP 705 is less than Threshold3 (e.g., and there are no neighbor APs 710 associated with a parameter greater than Threshold4), the UE may generate an 'Imminent Disconnect' message, and may provide this message to an eNB. In this case, the eNB may instruct the UE to disconnect from the serving AP 705, or the UE may disconnect from serving AP 705 after a threshold amount of time has elapsed, as described elsewhere herein. Additionally, or alternatively, the UE may switch to an LTE-only mode when there are no neighbor APs 710 detected (e.g., a parameter associated with neighbor AP 710 is not greater than Threshold4).

As further shown, a fourth threshold, shown as Threshold4, may be associated with a roaming area of neighbor AP 710. Threshold4 may be referred to herein as a roaming threshold. When a parameter associated with neighbor AP 710 is greater than Threshold4, the UE may generate a 'Better Neighbor Found' message, and may provide this message to an eNB. In this case, the eNB may instruct the UE to connect to the neighbor AP 710, or may permit the UE to select a neighbor AP 710 with which to connect, as described elsewhere herein. In some aspects, the parameter associated with neighbor AP 710 should be greater than Threshold4 to prevent ping-ponging of the UE between serving AP 705 and neighbor AP 710.

As indicated above, FIG. 7 is provided as an example. Other examples are possible and may differ from what was described with respect to FIG. 7. For example, the thresholds described in connection with FIG. 7 are provided as examples. In practice, there may be additional thresholds, fewer thresholds, or different thresholds.

Figure 8:
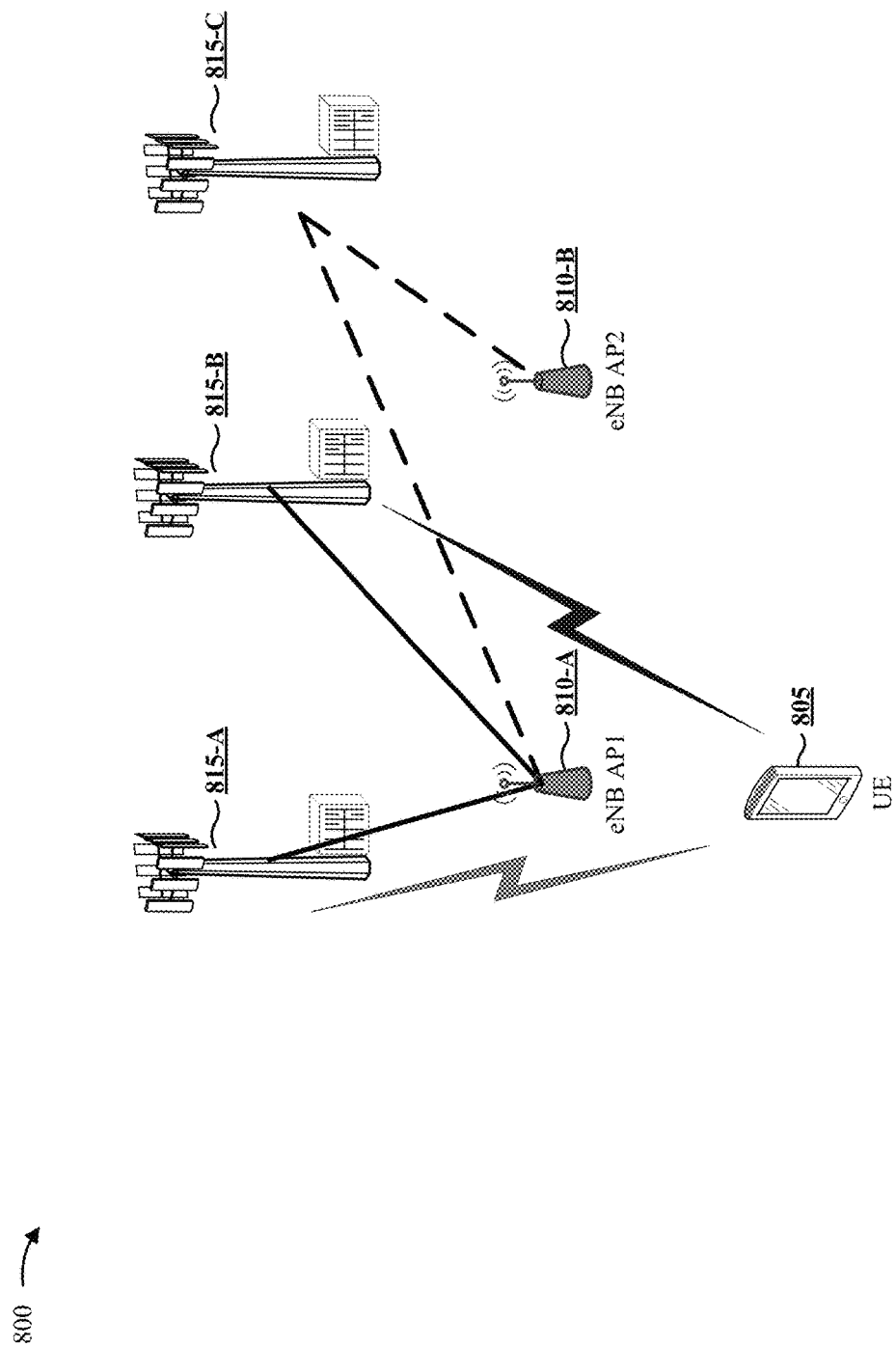
FIG. 8 is a conceptual diagram of example communications between an access point (AP) and an eNB in WWAN-WLAN aggregation management, in accordance with various aspects of the present disclosure.

FIG. 8 is a diagram of example communications between an AP and an eNB in WWAN-WLAN aggregation management for a UE 805. In some cases, an AP may serve multiple eNBs, or an eNB may serve multiple APs. For example, and as shown, an AP 810-A may serve an eNB 815-A, an eNB 815-B, and an eNB 815-C. As further shown, eNB 815-C may serve AP 810-A and AP 810-B. UE 805 may correspond to any of the UEs shown in another Figure, APs 810-A and 810-B may correspond to any of the APs shown in another Figure, and eNBs 815-A, 815-B, 815-C may correspond to any of the eNBs shown in another Figure. As described above, in some aspects, an eNB may instruct a UE to select an AP to which to connect and/or roam (e.g., using a 'Connect Anywhere' message or a 'Roam Anywhere' message). In this case, the AP to which the UE connects may need to communicate with the eNB serving the UE. For example, the AP may need to indicate to the eNB that the UE has connected to the AP, and may need to set up a control path and/or a data path with the eNB.

In some aspects, the AP may communicate with all eNBs which the AP serves to discover the eNB with which the UE is associated. In some aspects, the UE may provide, to the AP, information that identifies the eNB with which the UE is associated (e.g., from which the UE originates). In some aspects, the eNB may provide this information to the AP during an association procedure, a re-association procedure, an authentication procedure, or the like. For example, the information that identifies the eNB may be included in an association request, an authentication request, or the like. In this way, the UE may conserve network resources (e.g., overhead) that would otherwise be used if the AP were to communicate with all eNBs that the AP serves to discover the eNB with which the UE is associated.

As indicated above, FIG. 8 is provided as an example. Other examples are possible and may differ from what was described with respect to FIG. 8.

Figure 9:
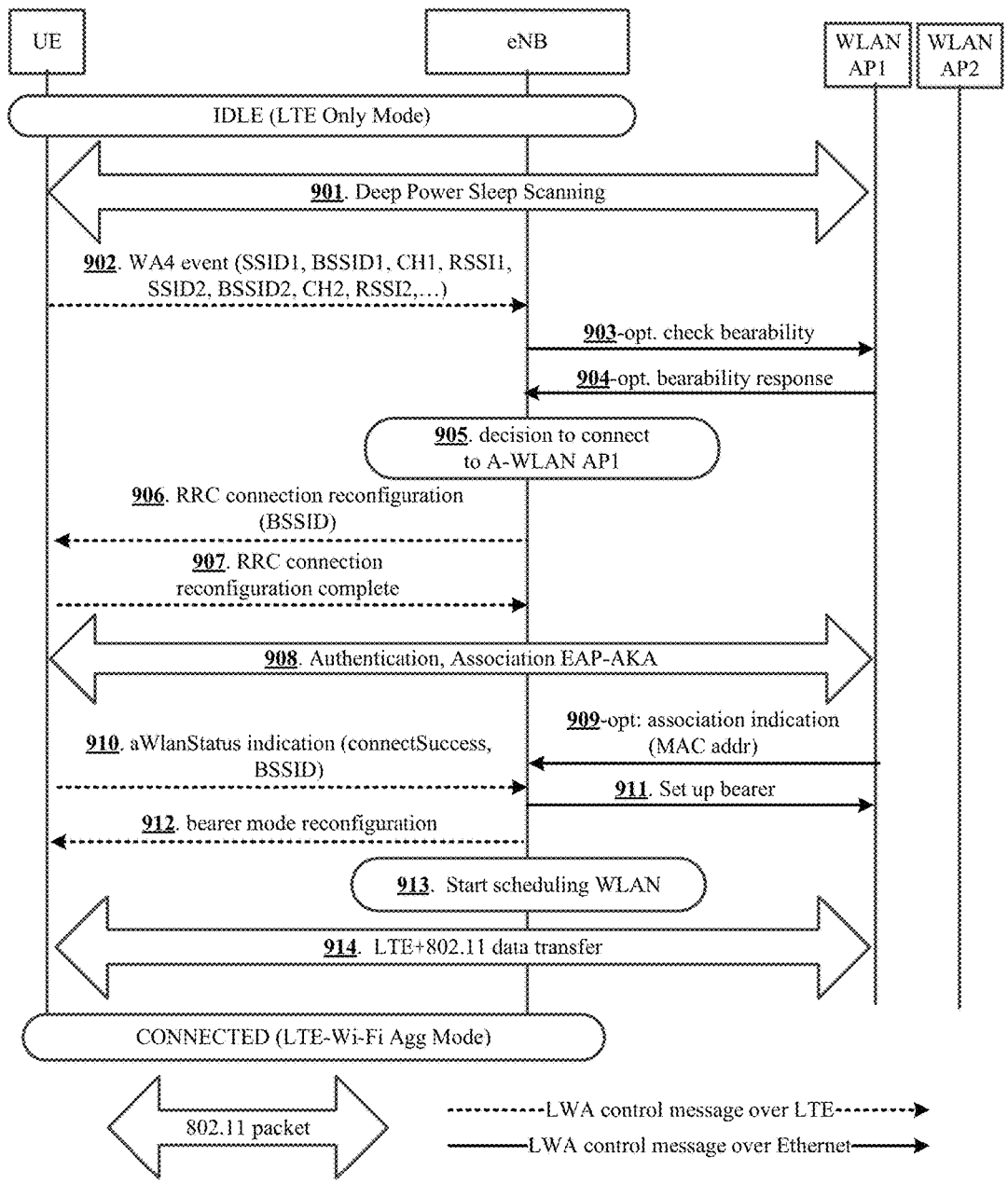
FIG. 9 is a flow diagram of an example call flow for an initial connection to an AP using WWAN-WLAN aggregation management, in accordance with various aspects of the present disclosure.

FIG. 9 is a diagram of an example call flow 900 for an initial connection to an AP using WWAN-WLAN aggregation management, in accordance with various aspects of the present disclosure. For example, FIG. 9 shows an example of switching from an LTE-only mode to an LTE-Wi-Fi aggregation mode where the eNB instructs the UE to connect to an AP selected by the eNB.

As shown, a UE and an eNB may initially communicate in an LTE-only mode, where a Wi-Fi communication mode is idle (e.g., in a deep power sleep mode). At 901, the UE may scan for usable APs (e.g., associated with a parameter that satisfies Threshold1). The UE may detect, for example, WLAN AP1 and WLAN AP2 as usable APs. At 902, the UE may provide a message (e.g., a 'Usable AP' message) to the eNB. In some aspects, the message may identify a WLAN (e.g., using an SSID), a WLAN AP (e.g., using a BSSID), a channel (e.g., using a channel identifier), a signal strength parameter (e.g., using an RSSI), or the like.

At 903, the eNB may request one or more conditions of WLAN AP 1 (and/or WLAN AP2), such as a bearability, a load, or the like. At 904, WLAN AP1 may respond to the request with a bearability parameter, a load parameter, or the like, that indicates a condition of WLAN AP1. Similarly, the eNB may request and receive one or more conditions from WLAN AP2 (not shown). At 905, the eNB may determine a WLAN AP to which the UE is to connect. In this case, the eNB determines that the UE is to connect to WLAN AP1.

At 906, the eNB may initiate a radio resource control (RRC) connection reconfiguration with the UE to configure the UE for a connection with WLAN AP1. The eNB may provide an AP identifier, such as a BSSID, that identifies WLAN AP1. At 907, the UE may complete the RRC connection reconfiguration. At 908, the UE may use the AP identifier, received from the eNB, to authenticate and associate with WLAN AP1 (e.g., using an extensible authentication protocol authentication and key agreement (EAP-AKA)).

At 909, WLAN AP1 may provide an association indication to the eNB. The association indication may confirm a connection between WLAN AP1 and the UE, and may include an AP identifier, such as a MAC address, that identifies WLAN AP1. At 910, the UE may confirm a connection with WLAN AP1. For example, the UE may provide, to the eNB, an indication that the connection was successfully established. In some aspects, the indication may include an AP identifier, such as a BSSID, that identifies WLAN AP1.

At 911, the eNB may set up a bearer for communications between WLAN AP1 and the UE. At 912, the eNB may reconfigure the UE to communicate over the bearer. At 913, the eNB may begin scheduling WLAN packets for delivery to the UE via WLAN AP1. At 914, WLAN AP1 and the UE may begin transferring data via WWAN-WLAN aggregation. In this way, the eNB may select an AP for a connection with a UE when using WWAN-WLAN aggregation management techniques described herein.

Figure 10:
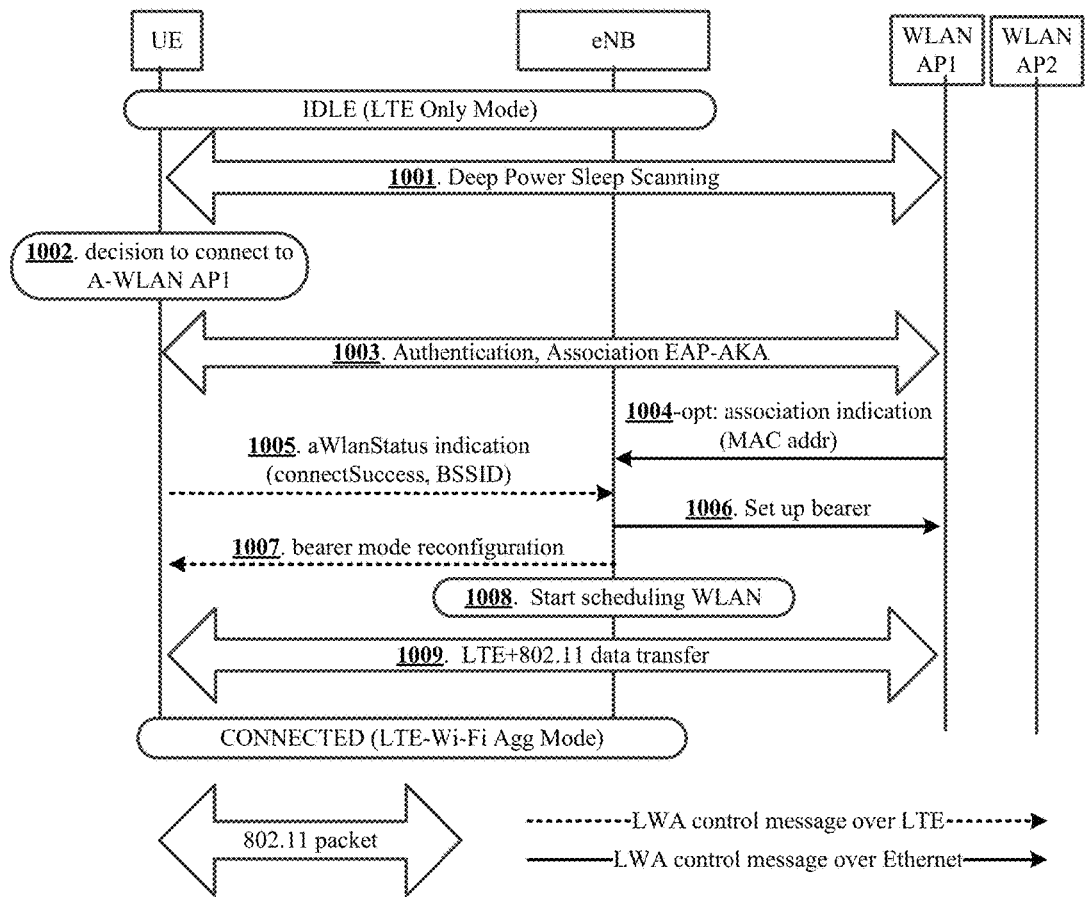
FIG. 10 is a flow diagram of another example call flow for an initial connection to an AP using WWAN-WLAN aggregation management, in accordance with various aspects of the present disclosure.

FIG. 10 is a diagram of another example call flow 1000 for an initial connection to an AP using WWAN-WLAN aggregation management, in accordance with various aspects of the present disclosure. For example, FIG. 10 shows an example of switching from an LTE-only mode to an LTE-Wi-Fi aggregation mode where a UE selects an AP for a WLAN connection.

As shown, a UE and an eNB may initially communicate in an LTE-only mode, where a Wi-Fi communication mode is idle (e.g., in a deep power sleep mode). At 1001, the UE may scan for usable APs (e.g., associated with a parameter that satisfies Threshold1). The UE may detect, for example, WLAN AP1 and WLAN AP2 as usable APs. At 1002, the UE may determine a WLAN AP to which the UE is to connect (e.g., based at least in part on one or more parameters). In this case, the UE determines that the UE is to connect to WLAN AP1. At 1003, the UE may authenticate and associate with WLAN AP1 (e.g., using an extensible authentication protocol authentication and key agreement (EAP-AKA)).

At 1004, WLAN AP1 may provide an association indication to the eNB. The association indication may indicate a connection between WLAN AP1 and the UE, and may include an AP identifier, such as a MAC address, that identifies WLAN AP1. At 1005, the UE may confirm a connection with WLAN AP1. For example, the UE may provide, to the eNB, an indication that the connection was successfully established. In some aspects, the indication may include an AP identifier, such as a BSSID, that identifies WLAN AP1.

At 1006, the eNB may set up a bearer for communications between WLAN AP1 and the UE. At 1007, the eNB may reconfigure the UE to communicate over the bearer. At 1008, the eNB may begin scheduling WLAN packets for delivery to the UE via WLAN AP1. At 1009, WLAN AP1 and the UE may begin transferring data via WWAN-WLAN aggregation. In this way, the UE may select an AP for a connection when using WWAN-WLAN aggregation management techniques described herein.

As indicated above, FIG. 10 is provided as an example. Other examples are possible and may differ from what was described with respect to FIG. 10.

Figure 11:
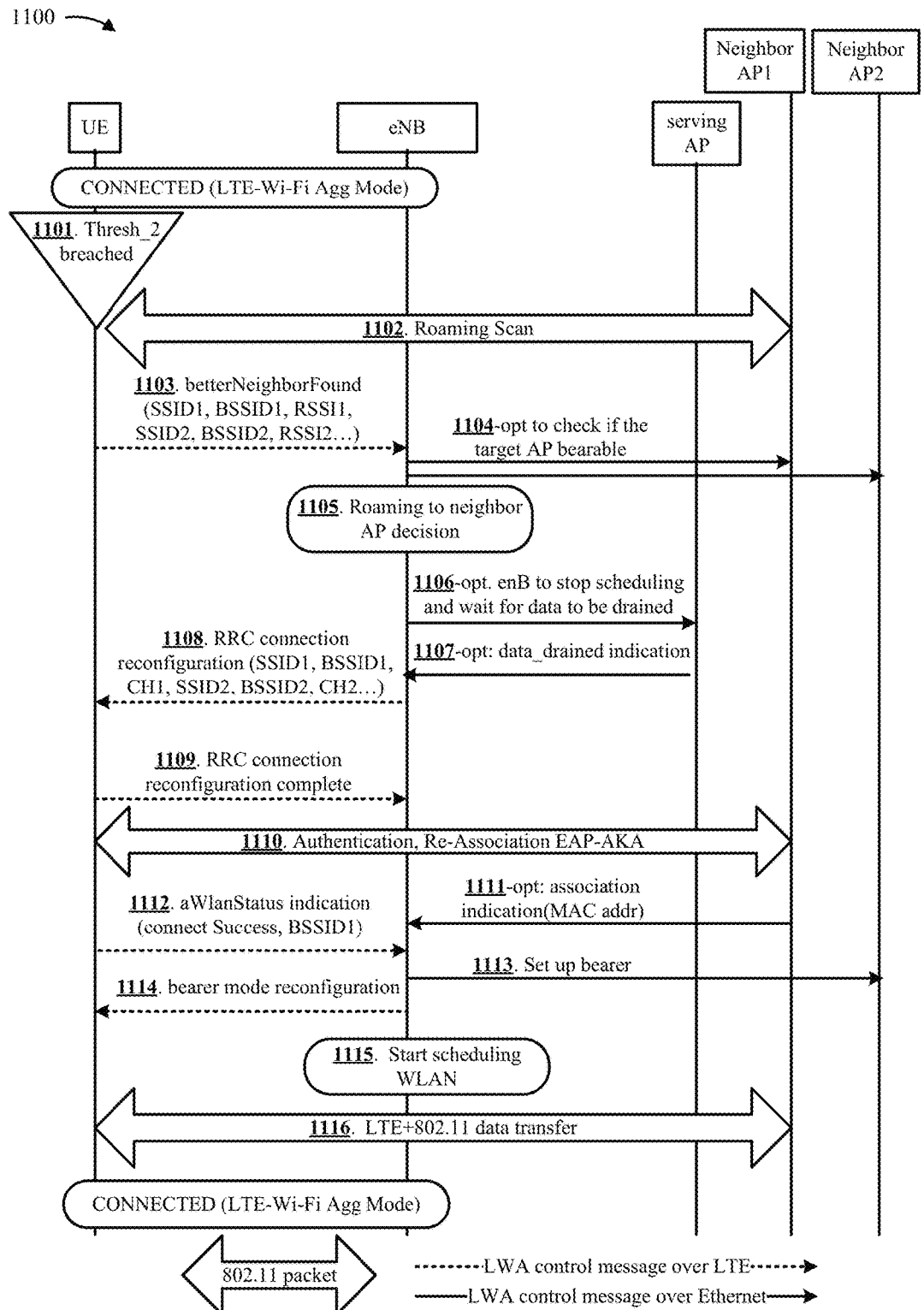
FIG. 11 is a flow diagram of an example call flow for roaming from a serving AP to a neighbor AP using WWAN-WLAN aggregation management, in accordance with various aspects of the present disclosure.

FIG. 11 is a diagram of an example call flow 1100 for roaming from a serving AP to a neighbor AP using WWAN-WLAN aggregation management, in accordance with various aspects of the present disclosure. For example, FIG. 11 shows an example where a UE roams from a serving AP to a neighbor AP, where an eNB instructs the UE to roam to a neighbor AP selected by the eNB.

As shown, a UE may communicate with an eNB via a first RAT (e.g., an LTE RAT), and may communicate with a serving AP via a second RAT (e.g., a Wi-Fi RAT) in an LTE-Wi-Fi aggregation mode. At 1101, the UE may determine that a parameter associated with the serving AP satisfies a threshold. For example, the UE may determine that the parameter is greater than Threshold2 and less than Threshold1, indicating that the UE is in a roaming search area. At 1102, based at least in part on this determination, the UE may scan for neighbor APs. The UE may detect, for example, neighbor AP1 and neighbor AP2 as neighbor APs. At 1103, the UE may provide a message (e.g., a 'Better Neighbor Found' message) to the eNB. In some aspects, the message may identify a WLAN (e.g., using an SSID), a WLAN AP (e.g., using a BSSID), a channel (e.g., using a channel identifier), a signal strength parameter (e.g., using an RSSI), or the like.

At 1104, the eNB may request one or more conditions of neighbor AP1 and neighbor AP2, such as a bearability, a load, or the like. Neighbor AP1 and neighbor AP2 may respond to the request with a bearability parameter, a load parameter, or the like, that indicates a condition of neighbor AP1 and neighbor AP2. At 1105, the eNB may determine a neighbor AP to which the UE is to roam. In this case, the eNB determines that the UE is to connect to neighbor AP1.

At 1106, the eNB may stop scheduling packets for the serving AP, and may wait to receive an indication that scheduled packets have been transmitted by the serving AP to the UE (e.g., a 'Data Drained' indication). At 1107, the serving AP may provide the indication to the eNB. At 1108, the eNB may initiate a radio resource control (RRC) connection reconfiguration with the UE to configure the UE for a connection with neighbor AP1. The eNB may provide an AP identifier, such as a BSSID, that identifies neighbor AP1. At 1109, the UE may complete the RRC connection reconfiguration.

At 1110, the UE may use the AP identifier, received from the eNB, to authenticate and associate with neighbor AP1 (e.g., using an extensible authentication protocol authentication and key agreement (EAP-AKA)). At 1111, neighbor AP1 may provide an association indication to the eNB. The association indication may confirm a connection between neighbor AP1 and the UE, and may include an AP identifier, such as a MAC address, that identifies neighbor AP1. At 1112, the UE may confirm a connection with neighbor AP1. For example, the UE may provide, to the eNB, an indication that the connection was successfully established. In some aspects, the indication may include an AP identifier, such as a BSSID, that identifies neighbor AP1.

At 1113, the eNB may set up a bearer for communications between neighbor AP1 and the UE. At 1114, the eNB may reconfigure the UE to communicate over the bearer. At 1115, the eNB may begin scheduling WLAN packets for delivery to the UE via neighbor AP1. At 1116, neighbor AP1 and the UE may begin transferring data via WWAN-WLAN aggregation. In this way, the eNB may select a neighbor AP to which the UE is to roam when using WWAN-WLAN aggregation techniques described herein. In some aspects, the UE may select a neighbor AP to which to roam in a similar manner as selecting a usable AP to which to connect, as described above in connection with FIG. 10.

As indicated above, FIG. 11 is provided as an example. Other examples are possible and may differ from what was described with respect to FIG. 11.

Figure 12:
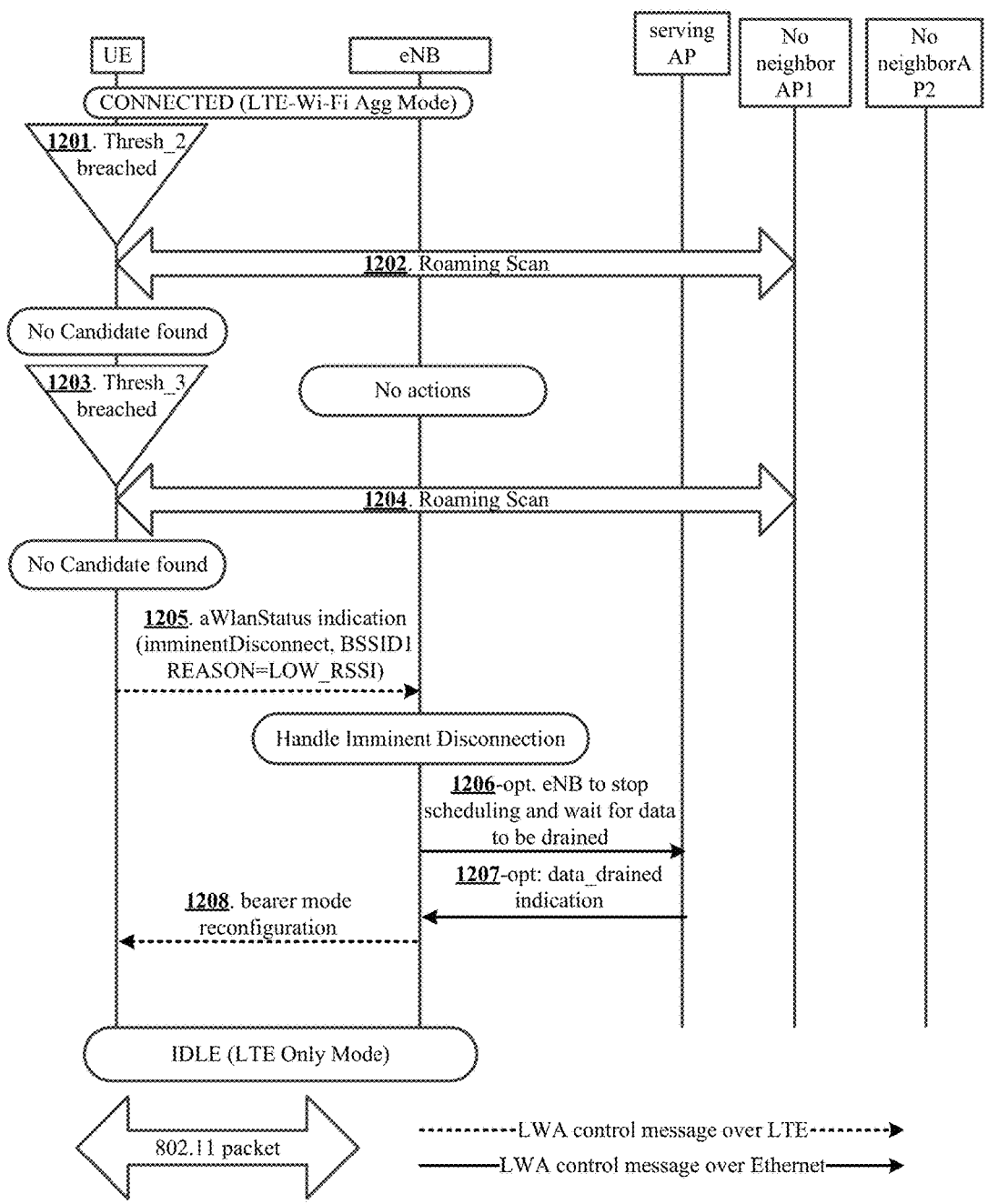
FIG. 12 is a flow diagram of an example call flow for disconnecting from a serving AP using WWAN-WLAN aggregation management, in accordance with various aspects of the present disclosure.

FIG. 12 is a diagram of an example call flow 1200 for disconnecting from a serving AP using WWAN-WLAN aggregation management, in accordance with various aspects of the present disclosure. For example, FIG. 12 shows an example where a UE disconnects from a serving AP when there are no neighbor APs to which the UE may connect.

As shown, a UE may communicate with an eNB via a first RAT (e.g., an LTE RAT), and may communicate with a serving AP via a second RAT (e.g., a Wi-Fi RAT) in an LTE-Wi-Fi aggregation mode. At 1201, the UE may determine that a parameter associated with the serving AP satisfies a threshold. For example, the UE may determine that the parameter is greater than Threshold2 and less than Threshold1, indicating that the UE is in a roaming search area. At 1202, based at least in part on this determination, the UE may scan for neighbor APs. In this case, the UE may determine that there are no neighbor APs to which the UE may connect. For example, the UE may determine that there are no neighbor APs associated with a parameter that satisfies Threshold4.

At 1203, the UE may determine that a parameter associated with the serving AP satisfies another threshold. For example, the UE may determine that the parameter is greater than Threshold3 and less than Threshold2, indicating that the UE is in a degraded coverage area of the serving AP. At 1204, based at least in part on this determination, the UE may scan for neighbor APs. In this case, the UE may determine that there are no neighbor APs to which the UE may connect.

At 1205, the UE may provide a message to the eNB (e.g., an 'Imminent Disconnect' message), indicating that the UE is approaching a proximity of a coverage area of the serving AP. The message may include, for example, an AP identifier that identifies the serving AP (e.g., a BSSID), and a reason for the message. In this case, the reason may indicate that the UE has detected a low RSSI associated with the serving AP.

Based at least in part on receiving the message, the eNB may handle the imminent disconnect. For example, at 1206, the eNB may stop scheduling packets for the serving AP, and may wait to receive an indication that scheduled packets have been transmitted by the serving AP to the UE (e.g., a 'Data Drained' indication). At 1207, the serving AP may provide the indication to the eNB. At 1208, the eNB may initiate a radio resource control (RRC) connection reconfiguration with the UE to configure the UE to disconnect from the serving AP. The UE may disconnect from the serving AP, and may enter an LTE-only mode (e.g., a WLAN chip of the UE may enter a power saving mode). In this way, the eNB may reduce or eliminate packet loss when using WWAN-WLAN aggregation management techniques described herein, and the UE may conserve battery power by entering a power saving mode.

In some aspects, upon release of an RRC connection, the UE may maintain a connection with the serving AP for a period of time. The period of time may be configurable by the eNB, or may be determined by the UE. In some aspects, the period of time may be based at least in part on a UE mobility parameter, such as a speed determined based at least in part on a global positioning system (GPS), a mobility counter, a mobility sensor, or the like. During this period of time, if a parameter associated with the serving AP falls below a threshold (e.g., Threshold3, an out-of-coverage threshold, etc.), the UE may disconnect from the serving AP and/or may roam to a neighbor AP (e.g., a neighbor AP configured by the eNB and/or determined by the UE). Upon restart of an RRC connection with the eNB, the UE may inform the eNB of any maintained WLAN connections, such as the connection with the serving AP (e.g., using a BSSID). In this way, the UE may maintain connectivity and reduce packet loss.

As indicated above, FIG. 12 is provided as an example. Other examples are possible and may differ from what was described with respect to FIG. 12.

Figure 13:
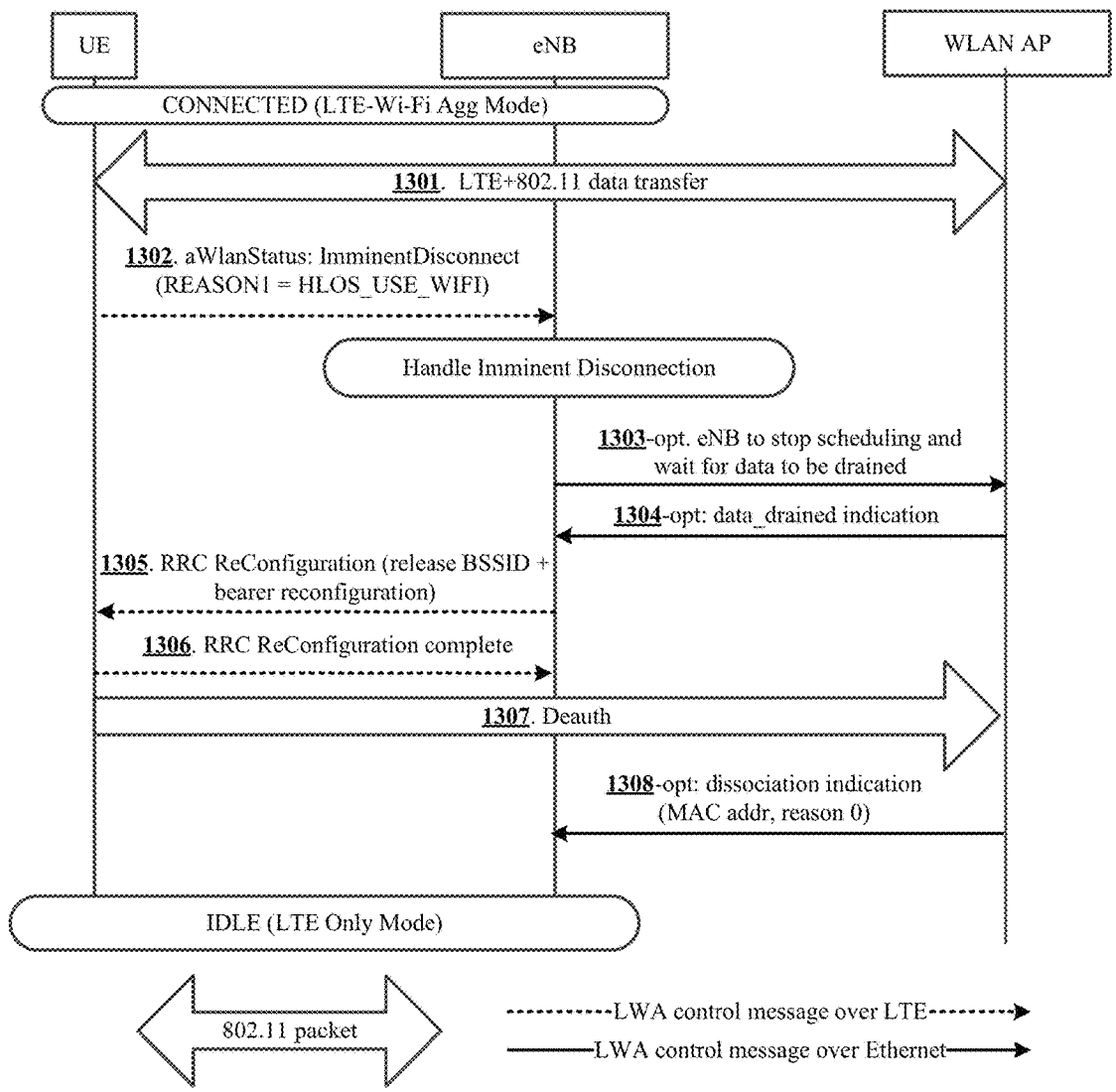
FIG. 13 is a flow diagram of an example call flow for disconnecting from a serving AP using WWAN-WLAN aggregation management, in accordance with various aspects of the present disclosure.

FIG. 13 is a diagram of an example call flow 1300 for disconnecting from a serving AP using WWAN-WLAN aggregation management, in accordance with various aspects of the present disclosure. For example, FIG. 13 shows an example where a UE disconnects from a WLAN AP based at least in part on user input.

As shown, a UE may communicate with an eNB via a first RAT (e.g., an LTE RAT), and may communicate with a WLAN AP (e.g., a serving AP) via a second RAT (e.g., a Wi-Fi RAT) in an LTE-Wi-Fi aggregation mode. At 1301, the UE and the WLAN AP may communicate via a Wi-Fi RAT. At 1302, the UE may receive user input to disconnect from the WLAN AP (e.g., and/or to discontinue a WWAN-WLAN aggregation mode, or force to connect to a WWAN-WLAN aggregation non-capable AP), and the UE may provide a message to the eNB (e.g., an 'Imminent Disconnect' message), indicating that user input was received to disconnect from the WLAN AP and/or to discontinue a WWAN-WLAN aggregation mode. The message may include, for example, an AP identifier that identifies the WLAN AP (e.g., a BSSID), and a reason for the message. In this case, the reason may indicate that the user has provided input to disconnect from the WLAN AP (e.g., the user has interacted with the UE to turn off LTE-WLAN or to connect to LTE-WLAN non-capable AP, or the like).

Based at least in part on receiving the message, the eNB may handle the imminent disconnect. For example, at 1303, the eNB may stop scheduling packets for the WLAN AP, and may wait to receive an indication that scheduled packets have been transmitted by the WLAN AP to the UE (e.g., a 'Data Drained' indication). At 1304, the WLAN AP may provide the indication to the eNB. At 1305, the eNB may initiate a radio resource control (RRC) connection reconfiguration with the UE to configure the UE to disconnect from the WLAN AP. At 1306, the UE may complete the RRC connection reconfiguration.

At 1307, the UE may disconnect from the WLAN AP, such as by sending a de-authentication message and/or a de-association message to the WLAN AP. At 1308, the WLAN AP may provide a disassociation indication, to the eNB, to indicate that the WLAN AP and the UE have been disconnected. The disassociation indication may include an AP identifier, such as a MAC address, that identifies the WLAN AP, and may include a reason for the disconnection. In some aspects, the UE may enter an LTE-only mode (e.g., a WLAN chip of the UE may enter a power saving mode) after disconnecting from the WLAN AP. In this way, the eNB may reduce or eliminate packet loss when using WWAN-WLAN aggregation management techniques described herein, and the UE may conserve battery power.

As indicated above, FIG. 13 is provided as an example. Other examples are possible and may differ from what was described with respect to FIG. 13.

Figure 14:
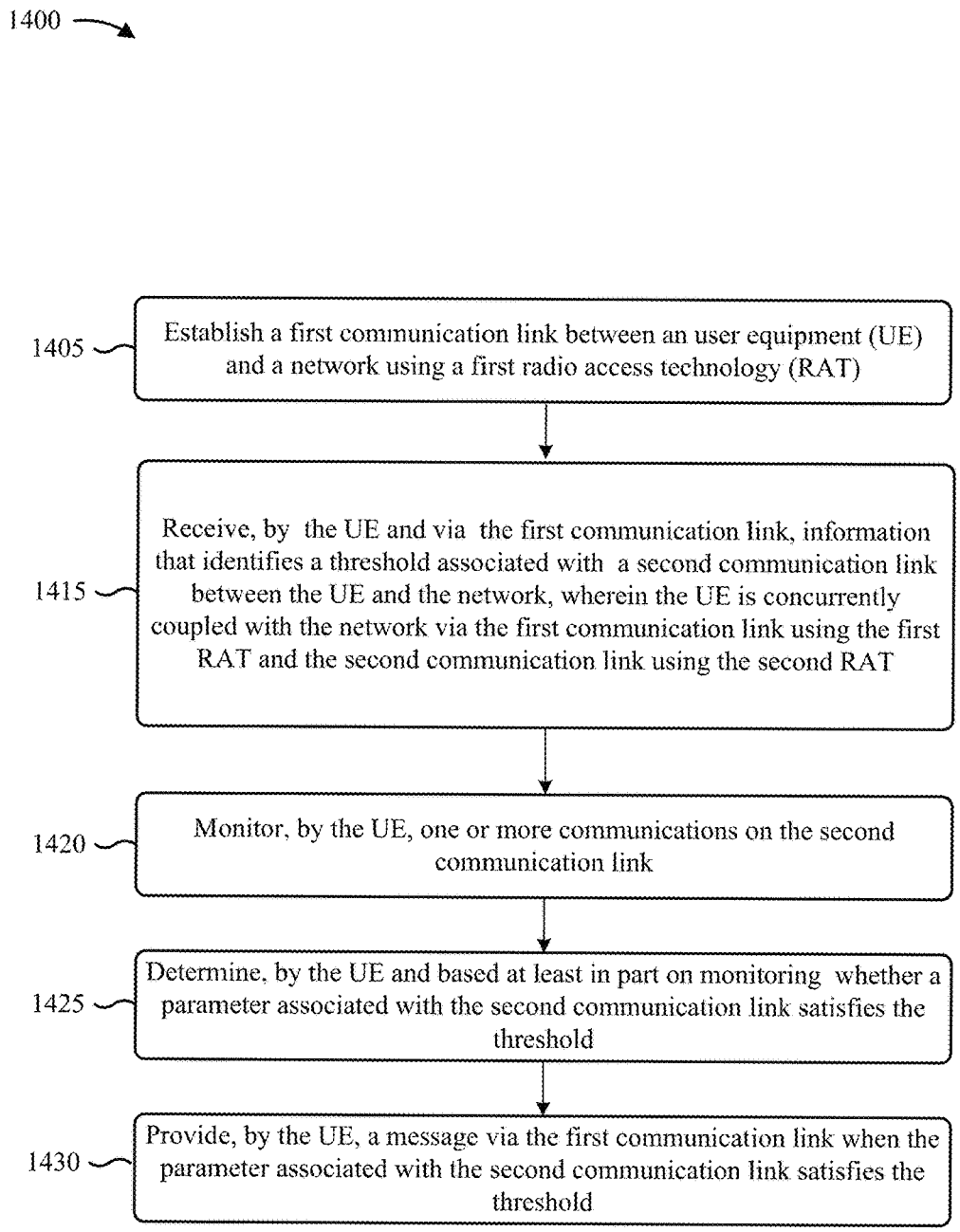

FIG. 14 is a flow diagram of an example process 1400 WWAN-WLAN aggregation management, in accordance with various aspects of the present disclosure. In some aspects, one or more process blocks of FIG. 14 may be performed by UE 215 and/or another UE described herein. Each block shown in FIG. 14 represents one or more processes, methods or subroutines, carried out in exemplary method 1400.

At block 1405, the method 1400 may include establishing a first communication link between an UE and a network (e.g., core network 130) using a first radio access technology (RAT). In some examples, the first RAT may correspond to a WWAN RAT (e.g., LTE). In some examples, aspects of block 1405 may be performed by controller/processor 280 operating in connection with a transceiver, for example.

At block 1415, the method 1400 may include receiving, by the UE and via the first communication link, information that identifies a threshold associated with the second communication link between the UE and the network. The UE may be concurrently coupled with the network via the first communication link using the first RAT and the second communication link using the second RAT. Particularly, in some examples, the UE may establish a concurrent second communication link between the UE and an access point using a second RAT during the same time that the UE has an active connection with the core network via the first RAT. In some examples, the second RAT may correspond to a WLAN RAT (e.g., Wi-Fi) and the access point may be a WLAN access point.

In some aspects, UE 215 may receive, via a first communication link that uses a first RAT, information that identifies a threshold associated with a second communication link that uses a second RAT. In some aspects, the first RAT may include a WWAN RAT (e.g., an LTE RAT). In some aspects, the second RAT may include a WLAN RAT (e.g., a Wi-Fi RAT). In some aspects, UE 215 may receive the information that identifies the threshold from eNB 210 and/or another eNB described herein. In some examples, the information that identifies a threshold (e.g., configuration information) may be received either prior to the UE establishing communication with the second communication link with the core network or after establishing the second communication link. In other words, the UE may receive the threshold information from the first RAT regarding the second RAT prior to the UE establishing communication with the second RAT such that once the UE establishes the communication with the second communication link, the UE may be able to monitor the second communication link (1420) and determine whether a parameter associated with the second communication link satisfies the threshold (1425). In other examples, the threshold information may be received at the UE after the UE has established both the first communication and the second communication link. In such example, the UE is concurrently coupled to the core network via the first RAT and the second RAT prior to receiving the threshold information from the first RAT regarding the second RAT. In some examples, aspects of block 1415 may be performed by reception processor 258 described with reference to FIG. 2.

At block 1420, the method 1400 may include monitoring, by the UE, one or more communications on the second communication link. For example, UE 215 may monitor one or more communications on the second communication link. In some aspects, UE 215 may monitor one or more communications using the second RAT. In some examples, aspects of block 1420 may be performed by the controller/processor 280 described with reference to FIG. 2.

At block 1425, the method 1400 may include determining whether a parameter associated with the second communication link satisfies the threshold. For example, UE 215 may determine whether a parameter associated with the second communication link (e.g., the WLAN RAT) satisfies the threshold. In some aspects, UE 215 may receive information that identifies one or more access points that communicate using the second RAT. UE 215 may determine whether the parameter, associated with the one or more access points, satisfies the threshold. The information that identifies the one or more access points may include, for example, a service set identifier (SSID), a basic service set identifier (BSSID), or the like. In some examples, aspects of block 1425 may be performed by the controller/processor 280 described with reference to FIG. 2.

At block 1430, the method 1400 may include providing a message via the first communication link when the parameter associated with the second communication link satisfies the threshold (block 1440). For example, UE 215 may provide a message via the first communication link when the parameter associated with the second communication link satisfies the threshold. In some aspects, UE 215 may prevent UE 215 from providing a message (e.g., a periodic measurement report) when the parameter does not satisfy the threshold. In some examples, aspects of block 1430 may be performed by the transmit processor 264 described with reference to FIG. 2.

Additionally, or alternatively, the threshold may include a first threshold, associated with the serving access point, and a second threshold associated with a neighbor access point that communicates using the second RAT. UE 215 may determine that a first parameter, associated with the serving access point, satisfies the first threshold. UE 215 may determine that a second parameter, associated with the neighbor access point, does not satisfy the second threshold. UE 215 may prevent UE 215 from providing the message based at least in part on determining that the first parameter satisfies the first threshold and the second parameter does not satisfy the second threshold.

In some aspects, UE 215 may communicate with a serving access point using the second RAT. UE 215 may determine that a radio resource control (RRC) connection, associated with the UE, has been released. UE 215 may maintain a connection with the serving access point for a period of time after determining that the RRC connection has been released. In some aspects, the period of time may be based at least in part on information received via the first communication link, information associated with mobility of the UE, or the like. In some aspects, the parameter may be associated with the serving access point. UE 215 may determine that the parameter is less than the threshold, and may disconnect from the serving access point or may roam to a neighbor access point based at least in part on determining that the parameter is less than the threshold. In some aspects, UE 215 may determine that another RRC connection has been established with a base station. UE 215 may provide, to the base station, information that identifies the serving access point.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
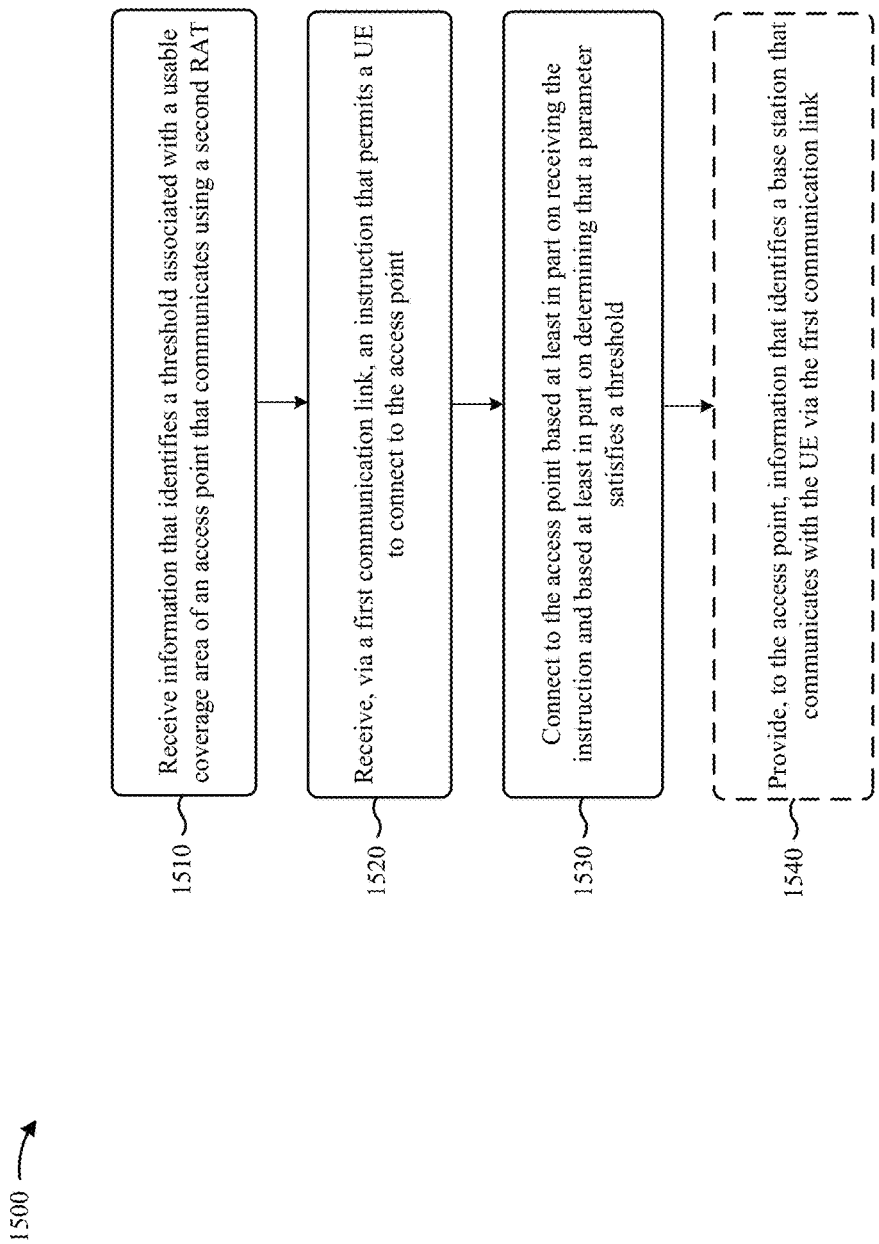

FIG. 15 is a flow diagram of an example a method 1500 for WWAN-WLAN aggregation management, in accordance with various aspects of the present disclosure. In some aspects, one or more process blocks of FIG. 15 may be performed by UE 215 and/or another UE described herein. Each block shown in FIG. 15 represents one or more processes, methods or subroutines, carried out in exemplary method 1500.

At block 1510, the method 1500 may include receiving information that identifies a threshold associated with a usable coverage area of an access point that communicates using a second RAT (block 1510). For example, UE 215 may receive, via a first communication link that uses a first RAT, information that identifies a threshold associated with a second communication link that uses a second RAT. In some aspects, the threshold may be associated with a usable coverage area of an access point that communicates using the second RAT. In some aspects, UE 215 may receive the information that identifies the threshold from eNB 210 and/or another eNB described herein. In some examples, aspects of block 1510 may be performed by the reception processor 258 described with reference to FIG. 2.

At block 1520, the method 1500 may include receiving, via the first communication link, an instruction that permits the UE to connect to the access point (block 1520), and at block 1530, the method 1500 may include configuring the UE for connecting to the access point based at least in part on receiving the instruction and based at least in part on determining that a parameter satisfies the threshold (block 1530). For example, UE 215 may receive, from eNB 210, an instruction that permits UE 215 to connect to the access point. UE 215 may connect to the access point based at least in part on receiving the instruction and based at least in part on determining that the parameter satisfies the threshold. At block 1540, the method 1500 may optionally include providing, to the access point, information that identifies a base station that communicates with the UE via the first communication link using the first RAT. In some examples, aspects of block 1520, 1530, and 1540 may be performed by the reception processor 258, transmit processor 264, and/or processor 280 described with reference to FIG. 2.

In some aspects, UE 215 may receive information that identifies one or more conditions for connecting or roaming to an access point that communicates using the second RAT. UE 215 may determine whether the one or more conditions are satisfied, and may connect or roam to the access point based at least in part on determining that the one or more conditions are satisfied. In some aspects, the one or more conditions may include, for example, a throughput associated with the access point, a received signal strength indicator (RSSI) associated with the access point, a modulation and coding scheme (MCS) associated with the access point, or the like.

In some aspects, UE 215 may receive one or more access point identifiers corresponding to one or more access points that communicate using the second RAT. UE 215 may select an access point, of the one or more access points, to which to connect or roam. UE 215 may connect or roam to the access point based at least in part on selecting the access point. UE 215 may provide, via the first communication link, information that identifies the access point.

In some aspects, UE 215 may receive one or more access point identifiers corresponding to one or more access points, that communicate using the second RAT, to which the UE is not permitted to connect (e.g., a blacklist). UE 215 may prevent UE 215 from connecting or roaming to the one or more access points.

In some aspects, UE 215 may receive information that identifies a number of reports to be provided. UE 215 may provide the number of reports. UE 215 may receive, via the first communication link, an instruction that permits UE 215 to connect to an access point based at least in part on the number of reports. UE 215 may connect to the access point based at least in part on receiving the instruction.

In some aspects, UE 215 may receive an instruction that permits the UE to select an access point to which to connect or roam. UE 215 may select a neighbor access point to which to connect or roam based at least in part on receiving the instruction. UE 215 may connect or roam to the neighbor access point based at least in part on selecting the neighbor access point. In some aspects, UE 215 may select the neighbor access point based at least in part on, for example, a received signal strength indicator (RSSI) associated with the neighbor access point, a throughput associated with the neighbor access point, a load associated with the neighbor access point, a radiofrequency spectrum band associated with the neighbor access point, or the like.

In some aspects, UE 215 may provide, via the first communication link, information that identifies a plurality of access points. UE 215 may receive, via the first communication link, information that identifies an access point of the plurality of access points. UE 215 may connect or roam to the access point.

In some aspects, UE 215 may connect to an access point that communicates using the second RAT, based at least in part on determining whether the parameter satisfies the threshold. UE 215 may provide, to the access point, information that identifies a base station that communicates with the UE via the first communication link.

In some aspects, UE 215 may connect to a neighbor access point that communicates using the second RAT, based at least in part on determining whether the parameter satisfies the threshold. UE 215 may connect to the neighbor access point based at least in part on a determination that a serving access point, that communicates with the UE using the second RAT, has finished transmitting one or more scheduled communications to the UE.

Although FIG. 15 shows example blocks of method 1500, in some aspects, method 1500 may include additional blocks, fewer blocks, different blocks, or differently arranged blocks than those depicted in FIG. 15. Additionally, or alternatively, two or more of the blocks of methods 1500 may be performed in parallel.

Figure 16:
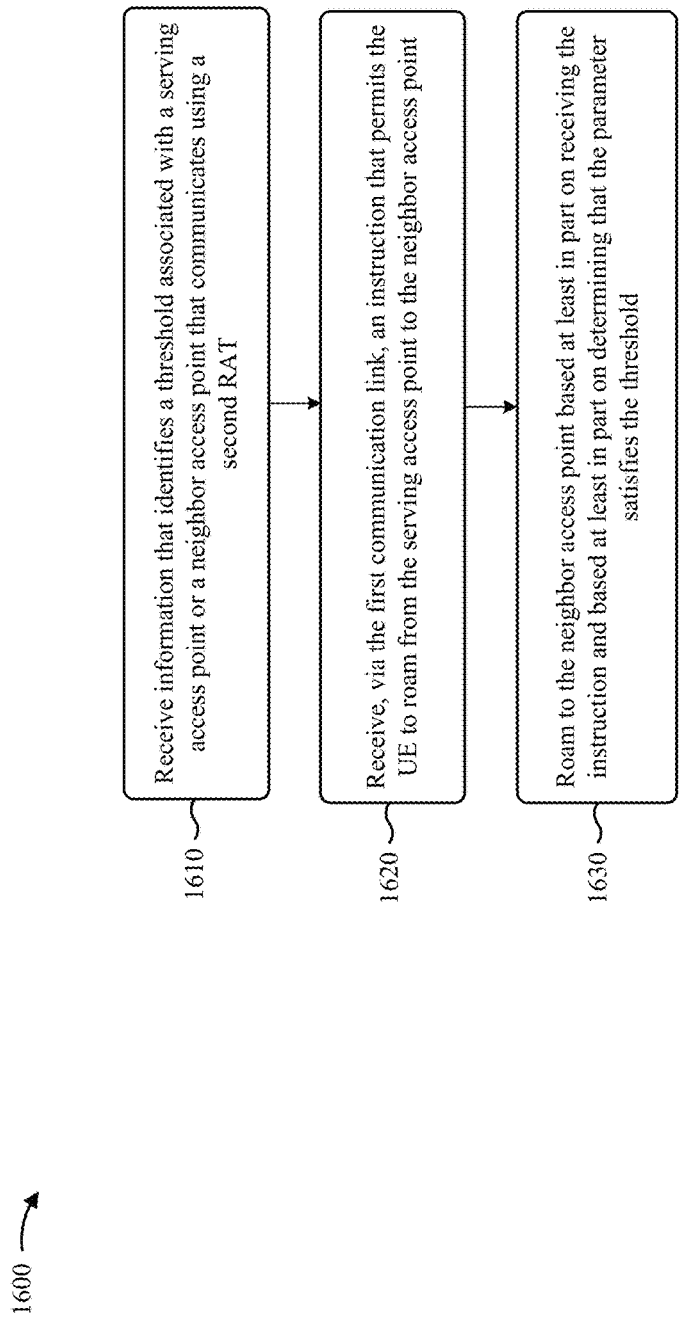

FIG. 16 is a flow diagram of an example method 1600 for WWAN-WLAN aggregation management, in accordance with various aspects of the present disclosure. In some aspects, one or more process blocks of FIG. 16 may be performed by UE 215 and/or another UE described herein. Each block shown in FIG. 16 represents one or more processes, methods or subroutines, carried out in exemplary method 1600.

At block 1610, the method 1600 may include receiving information that identifies a threshold associated with a serving access point or a neighbor access point that communicates using a second RAT (block 1610). For example, UE 215 may receive, via a first communication link that uses a first RAT, information that identifies a threshold associated with a second communication link that uses a second RAT. In some aspects, the threshold may be associated with a serving access point or a neighbor access point that communicates using the second RAT. In some aspects, UE 215 may receive the information that identifies the threshold from eNB 210 and/or another eNB described herein. In some examples, aspects of block 1610 may be performed by the reception processor 258 described with reference to FIG. 2.

At block 1620, the method 1600 may include receiving, via the first communication link, an instruction that permits the UE to roam from the serving access point to the neighbor access point (block 1620). Accordingly, at block 1630, the method 1600 may include roaming to the neighbor access point based at least in part on receiving the instruction and based at least in part on determining that a parameter satisfies the threshold (block 1630). For example, UE 215 may receive, from eNB 210, an instruction that permits UE 215 to roam to the neighbor access point. UE 215 may roam to the neighbor access point based at least in part on receiving the instruction and based at least in part on determining that the parameter satisfies the threshold. In some examples, aspects of block 1620 and 1630 may be performed by the reception processor 258, transmit processor 264, and/or processor 280 described with reference to FIG. 2.

In some aspects, UE 215 may receive information that identifies one or more conditions for connecting or roaming to an access point that communicates using the second RAT. UE 215 may determining whether the one or more conditions are satisfied, and may connect or roam to the access point based at least in part on determining that the one or more conditions are satisfied. In some aspects, the one or more conditions may include, for example, a throughput associated with the access point, a received signal strength indicator (RSSI) associated with the access point, a modulation and coding scheme (MCS) associated with the access point, or the like.

In some aspects, UE 215 may receive one or more access point identifiers corresponding to one or more access points that communicate using the second RAT. UE 215 may select an access point, of the one or more access points, to which to connect or roam. UE 215 may connect or roam to the access point based at least in part on selecting the access point. UE 215 may provide, via the first communication link, information that identifies the access point.

In some aspects, UE 215 may receive one or more access point identifiers corresponding to one or more access points, that communicate using the second RAT, to which the UE is not permitted to connect (e.g., a blacklist). UE 215 may prevent UE 215 from connecting or roaming to the one or more access points.

In some aspects, UE 215 may receive information that identifies a number of messages (e.g., reports) to be provided. UE 215 may provide the number of reports. UE 215 may receive, via the first communication link, an instruction that permits UE 215 to connect to an access point based at least in part on the number of reports. UE 215 may connect to the access point based at least in part on receiving the instruction.

In some aspects, UE 215 may receive an instruction that permits the UE to select an access point to which to connect or roam. UE 215 may select a neighbor access point to which to connect or roam based at least in part on receiving the instructions. UE 215 may connect or roam to the neighbor access point based at least in part on selecting the neighbor access point. In some aspects, UE 215 may select the neighbor access point based at least in part on, for example, a received signal strength indicator (RSSI) associated with the neighbor access point, a throughput associated with the neighbor access point, a load associated with the neighbor access point, a radiofrequency spectrum band associated with the neighbor access point, or the like.

In some aspects, UE 215 may provide, via the first communication link, information that identifies a plurality of access points. UE 215 may receive, via the first communication link, information that identifies an access point of the plurality of access points. UE 215 may connect or roam to the access point.

In some aspects, UE 215 may connect to an access point that communicates using the second RAT, based at least in part on determining whether the parameter satisfies the threshold. UE 215 may provide, to the access point, information that identifies a base station that communicates with the UE via the first communication link.

In some aspects, UE 215 may connect to a neighbor access point that communicates using the second RAT, based at least in part on determining whether the parameter satisfies the threshold. UE 215 may connect to the neighbor access point based at least in part on a determination that a serving access point, that communicates with the UE using the second RAT, has finished transmitting one or more scheduled communications to the UE.

Although FIG. 16 shows example blocks of method 1600, in some aspects, method 1600 may include additional blocks, fewer blocks, different blocks, or differently arranged blocks than those depicted in FIG. 16. Additionally, or alternatively, two or more of the blocks of method 1600 may be performed in parallel.

Figure 17:
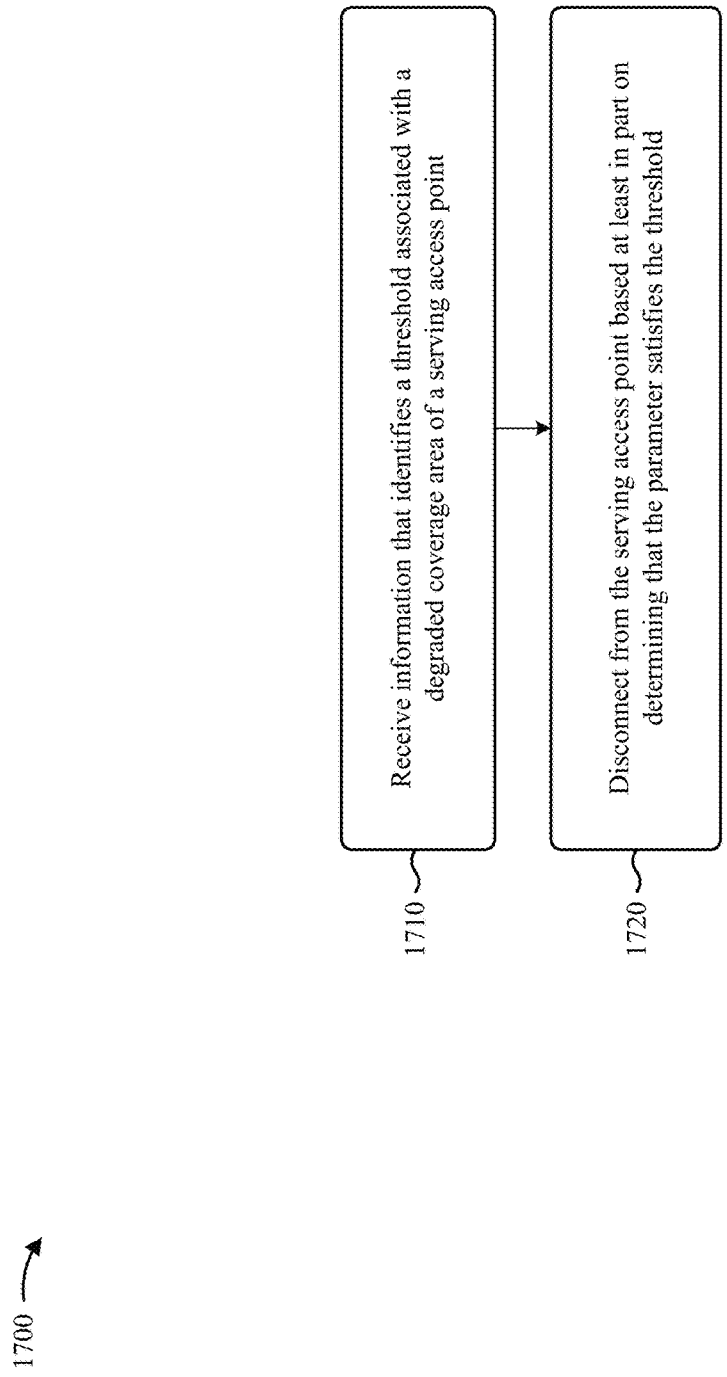

FIG. 17 is a flow diagram of an example process 1700 for WWAN-WLAN aggregation management, in accordance with various aspects of the present disclosure. In some aspects, one or more process blocks of FIG. 17 may be performed by UE 215 and/or another UE described herein. Each block shown in FIG. 17 represents one or more processes, methods or subroutines, carried out in exemplary method 1700.

At block 1710, the method 1700 may include receiving information that identifies a threshold associated with a degraded coverage area of a serving access point (block 1710). For example, UE 215 may receive, via a first communication link that uses a first radio access technology (RAT), information that identifies a threshold associated with a second communication link that uses a second RAT. In some aspects, the threshold may be associated with a degraded coverage area of a serving access point. In some aspects, UE 215 may receive the information that identifies the threshold from eNB 210 and/or another eNB described herein. In some examples, aspects of block 1710 may be performed by the reception processor 258 described with reference to FIG. 2.

At block 1720, the method 1700 may include disconnecting from the serving access point based at least in part on determining that the parameter satisfies the threshold (block 1720). For example, UE 215 may disconnect from the serving access point. In some aspects, UE 215 may disconnect from the serving access point based at least in part on determining that the parameter satisfies the threshold. In some examples, aspects of block 1720 may be performed by the reception processor 258, transmit processor 264, and/or processor 280 described with reference to FIG. 2.

In some aspects, UE 215 may communicate with a serving access point using the second RAT. UE 215 may receive user input that indicates that the UE 215 is to be disconnected from the serving access point. UE 215 may disconnect from the serving access point based at least in part on receiving the user input. In some aspects, UE 215 may receive, via the first communication link, an instruction to disconnect from the serving access point. UE 215 may disconnect from the serving access point based at least in part on receiving the instruction. In some aspects, UE 215 may determine that a threshold amount of time has elapsed since the message was provided. UE 215 may disconnect from the serving access point based at least in part on determining that the threshold amount of time has elapsed since the UE 215 has provided a message. In some aspects, UE 215 may disconnect from the serving access point, and may search for a neighbor access point based at least in part on disconnecting from the serving access point.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

FIG. 18 is a flow diagram of an example process 1800 for WWAN-WLAN aggregation management, in accordance with various aspects of the present disclosure. In some aspects, one or more process blocks of FIG. 18 may be performed by eNB 210 and/or another eNB described herein. Each block shown in FIG. 18 represents one or more processes, methods or subroutines, carried out in exemplary method 1800.

At block 1810, the method 1800 may include providing, to an user equipment (UE) via a first communication link that uses a first radio access technology (RAT), information that identifies a threshold associated with a second communication link that uses a second RAT (block 1810). For example, eNB 210 may provide, to UE 215 via a first communication link that uses a first RAT, information that identifies a threshold associated with a second communication link that uses a second RAT. In some aspects, the first RAT may include a WWAN RAT, and the second RAT may include a WLAN RAT. In some examples, aspects of 1810 may be performed by controller/processor 240 and/or transmit processor 220 as described with reference to FIG. 2.

At block 1820, the method 1800 may include providing an instruction that permits the UE to connect to, roam to, or disconnect from an access point that communicates using the second RAT (block 1820). In some aspects, the threshold may be associated with a usable coverage area of the access point. In this case, eNB 210 may receive information that identifies a plurality of access points. The eNB 210 may select the access point based at least in part on receiving the information that identifies the plurality of access points. The eNB 210 may provide, via the first communication link, an instruction for the UE to connect to or roam to the access point based at least in part on selecting the access point. In some aspects, the eNB 210 may select the access point based at least in part on, for example, a received signal strength indicator (RSSI) associated with the access point, a throughput associated with the access point, a load associated with the access point, a connectivity associated with the access point, a radiofrequency spectrum band associated with the access point, or the like. In some examples, aspects of 1820 may be performed by transmit processor 220 as described with reference to FIG. 2.

In some aspects, the threshold may be associated with a usable coverage area of the access point. In this case, the eNB 210 may provide an instruction that permits the UE to select an access point to which to connect or roam.

In some aspects, the threshold may be associated with a degraded coverage area of a serving access point associated with the UE. In this case, the eNB 210 may receive a message based at least in part on a determination that a parameter, associated with the serving access point, satisfies the threshold. The eNB 210 may provide an instruction to disconnect from the serving access point based at least in part on receiving the message.

In some aspects, the eNB 210 may receive a message from the UE. The eNB 210 may prevent communications from being scheduled for delivery to the UE via a serving access point that communicates with the UE using the second RAT based at least in part on receiving the message. The eNB 210 may receive, from the serving access point, an indication that one or more scheduled communications have been transmitted to the UE. The eNB 210 may provide the instruction based at least in part on receiving the indication that the one or more scheduled communications have been transmitted to the UE.

In some aspects, the eNB 210 may provide one or more access point identifiers corresponding to one or more access points, that communicate using the second RAT, to which the UE is not permitted to connect.

At bock 1825, the method 1800 may optionally include providing an instruction that permits the UE to select an access point to which to connect or road. In other examples, the eNB 210 may receive information that identifies a plurality of access points from the UE. In response, the eNB may select the access point and provide, via the first communication link, an instruction for the UE to connect to or road to the access point based at least in part on selecting the access point. In some examples, aspects of 1830 may be performed by transmit processor 220 as described with reference to FIG. 2.

At block 1830, the method 1800 may include receiving an indication that the UE has connected to, roamed to, or disconnected from the access point (block 1830). For example, the eNB 210 may receive, from UE 215, an indication that UE 215 has connected to, roamed to, or disconnected from the access point. In some aspects, the eNB 210 may receive a confirmation that the UE has connected to the access point, and may schedule communications for delivery to the UE via the access point based at least in part on receiving the confirmation. In some examples, aspects of 1830 may be performed by reception processor 238 as described with reference to FIG. 2.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based at least in part on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for wireless communication, comprising:
   establishing a first communication link between a user equipment (UE) and a network using a first radio access technology (RAT);
   receiving, by the UE and via the first communication link, an information that identifies a threshold associated with a second communication link between the UE and the network, wherein the UE is concurrently coupled with the network via the first communication link using the first RAT and the second communication link using a second RAT;
   monitoring, by the UE, one or more communications on the second communication link;
   determining, by the UE and based at least in part on the monitoring, whether a parameter associated with the second communication link satisfies the threshold;
   providing, by the UE, a message via the first communication link when the parameter associated with the second communication link satisfies the threshold;
   receiving, by the UE, an instruction that permits the UE to select an access point to which to connect or roam;
   selecting, by the UE, a neighbor access point to which to connect or roam based at least in part on receiving the instruction; and
   connecting or roaming, by the UE, to the neighbor access point that communicates using the second RAT based at least in part on selecting the neighbor access point.

2. The method of claim 1, wherein the second communication link between the UE and the network using the second RAT comprises establishing communication with a serving access point;
   wherein the threshold is associated with the serving access point or the neighbor access point that communicates using the second RAT; and wherein the
instruction that permits the UE to select the access point to which connect or roam is received via the first communication link; and
wherein the connecting or roaming to the neighbor access point is based at least in part on receiving the instruction and based at least in part on determining that the parameter satisfies the threshold.

3. The method of claim 1, further comprising:
receiving information that identifies one or more conditions for connecting or roaming to the access point that communicates using the second RAT; and
determining whether the one or more conditions are satisfied;
wherein the connecting or roaming to the neighbor access point associated with the second communication link is based at least in part on determining that the one or more conditions are satisfied.

4. The method of claim 3, wherein the one or more conditions are associated with at least one of:
a throughput associated with the access point;
a received signal strength indicator (RSSI) associated with the access point; or
a modulation and coding scheme (MCS) associated with the access point.

5. The method of claim 1, further comprising:
receiving one or more access point identifiers corresponding to one or more access points that communicate using the second RAT; and
providing, via the first communication link, information that identifies the selected neighbor access point.

6. The method of claim 5, wherein the one or more access point identifiers includes at least one of:
a service set identifier (SSID); or
a basic service set identifier (BSSID).

7. The method of claim 1, further comprising:
receiving one or more access point identifiers corresponding to one or more access points, that communicate using the second RAT, to which the UE is not permitted to connect; and
preventing the UE from connecting or roaming to the one or more access points.

8. The method of claim 1, wherein
connecting or roaming to the neighbor access point, that communicates using the second RAT, is based at least in part on determining whether the parameter satisfies the threshold.

9. The method of claim 1, further comprising:
providing, to an access point of the network, information that identifies a base station that communicates with the UE via the first communication link.

10. The method of claim 1, wherein
connecting or roaming to the neighbor access point, that communicates using the second RAT, is based at least in part on determining whether the parameter satisfies the threshold and
based at least in part on
determining that the serving access point, that communicates with the UE using the second RAT, has finished transmitting one or more scheduled communications to the UE.

11. The method of claim 1, wherein the UE communicates with a serving access point using the second RAT;
wherein the threshold includes a first threshold, associated with the serving access point, and a second threshold associated with a neighbor access point that communicates using the second RAT; and
wherein the method further comprises:
determining that a first parameter, associated with the serving access point, satisfies the first threshold;
determining that a second parameter, associated with the neighbor access point, does not satisfy the second threshold; and
preventing the UE from providing the message based at least in part on determining that the first parameter satisfies the first threshold and the second parameter does not satisfy the second threshold.

12. The method of claim 1, wherein the UE communicates with a serving access point using the second RAT; and
wherein the method further comprises:
determining that a radio resource control (RRC) connection, associated with the UE, has been released; and
maintaining a connection with the serving access point for a period of time after determining that the RRC connection has been released.

13. A user equipment (UE) for wireless communication, comprising:
one or more processors to:
establish a first communication link between an user equipment (UE) and a network using a first radio access technology (RAT);
receive, by the UE and via the first communication link, information that identifies a threshold associated with a second communication link between the UE and the network, wherein the UE is concurrently coupled with the network via the first communication link using the first RAT and the second communication link using a second RAT;
monitor, by the UE, one or more communications on the second communication link;
determine, by the UE and based at least in part on monitoring whether a parameter associated with the second communication link satisfies the threshold;
provide, by the UE, a message via the first communication link when the parameter associated with the second communication link satisfies the threshold;
receive, by the UE, an instruction that permits the UE to select an access point to which to connect or roam;
select, by the UE, a neighbor access point to which to connect or roam based at least in part on receiving the instruction; and
connect or roam, by the UE, to the neighbor access point that communicates using the second RAT based at least in part on selecting the neighbor access point.

14. The UE of claim 13, wherein:
the UE communicates with a serving access point using the second RAT;
the threshold is associated with the serving access point or a neighbor access point that communicates using the second RAT;
the instruction that permits the UE to select the neighbor access point to which to connect or roam is received via the first communication link; and
the connect or roam to the neighbor access point is based at least in part on receiving the instruction and based at least in part on determining that the parameter satisfies the threshold.

* * * * *